(12) United States Patent
Roychowdhury et al.

(10) Patent No.: US 11,948,358 B2
(45) Date of Patent: Apr. 2, 2024

(54) SELF-SUPERVISED HIERARCHICAL EVENT REPRESENTATION LEARNING

(71) Applicant: ADOBE INC., San Jose, CA (US)

(72) Inventors: Sumegh Roychowdhury, Kolkata (IN); Sumedh A. Sontakke, Los Angeles, CA (US); Mausoom Sarkar, New Delhi (IN); Nikaash Puri, New Delhi (IN); Pinkesh Badjatiya, Madhya Pradesh (IN); Milan Aggarwal, Delhi (IN)

(73) Assignee: ADOBE INC., San Jose, CA (US)

( * ) Notice: Subject to any disclaimer, the term of this patent is extended or adjusted under 35 U.S.C. 154(b) by 345 days.

(21) Appl. No.: 17/455,126

(22) Filed: Nov. 16, 2021

(65) Prior Publication Data
US 2023/0154186 A1    May 18, 2023

(51) Int. Cl.
*G06V 20/40*    (2022.01)
*G06N 3/088*    (2023.01)

(52) U.S. Cl.
CPC ............ *G06V 20/41* (2022.01); *G06N 3/088* (2013.01); *G06V 20/47* (2022.01); *G06V 20/44* (2022.01)

(58) Field of Classification Search
CPC ........ G06V 20/41; G06V 20/47; G06V 20/44; G06V 10/82; G06V 10/764; G06V 10/454; G06V 10/7715; G06V 20/46; G06V 10/44; G06V 10/751; G06N 3/088; G06N 3/0442; G06N 3/0464; G06N 3/0895; G06N 3/0455; G06N 3/045; G06N 3/08; G06N 3/048; G06N 3/084; G06N 3/09; G06T 2207/20084; G06T 2207/20081; G06T 2207/30096; G06T 7/0012;
(Continued)

(56) References Cited

U.S. PATENT DOCUMENTS 11,562,287 B2 * 1/2023 Xiong ..................... G06N 3/044
11,615,240 B2 * 3/2023 Nguyen ................ G06F 40/205
704/9
(Continued)

OTHER PUBLICATIONS

1Berndt, et al. "Using Dynamic Time Warping to Find Patterns in Time Series", In KDD-94 AAAI-94 Workshop on Knowledge Discover in Databases, pp. 359-370, Seattle, WA, USA, 1994.
(Continued)

*Primary Examiner* — Michael S Osinski
(74) *Attorney, Agent, or Firm* — F. CHAU & ASSOCIATES, LLC

(57) ABSTRACT
Systems and methods for video processing are described. Embodiments of the present disclosure generate a plurality of image feature vectors corresponding to a plurality of frames of a video; generate a plurality of low-level event representation vectors based on the plurality of image feature vectors, wherein a number of the low-level event representation vectors is less than a number of the image feature vectors; generate a plurality of high-level event representation vectors based on the plurality of low-level event representation vectors, wherein a number of the high-level event representation vectors is less than the number of the low-level event representation vectors; and identify a plurality of high-level events occurring in the video based on the plurality of high-level event representation vectors.

20 Claims, 17 Drawing Sheets

(58) Field of Classification Search
CPC ............ G06T 2207/10024; G06T 7/11; G06F 18/214; G06F 18/23; G06F 18/24323
See application file for complete search history.

(56) References Cited

U.S. PATENT DOCUMENTS

| | | | |
|---|---|---|---|
| 11,776,236 B2* | 10/2023 | Li | G06F 18/23 |
| 2019/0095716 A1* | 3/2019 | Shrestha | G08B 21/187 |
| 2019/0114774 A1* | 4/2019 | Zhang | G06N 3/04 |
| 2019/0138554 A1* | 5/2019 | Remis | G06V 40/172 |
| 2019/0279074 A1* | 9/2019 | Lin | G06F 16/583 |
| 2020/0117937 A1* | 4/2020 | Lee | G06T 7/12 |
| 2021/0232851 A1* | 7/2021 | Redford | G06V 20/588 |
| 2021/0271887 A1* | 9/2021 | Sundareson | A63F 13/86 |
| 2021/0383231 A1* | 12/2021 | Liu | G06F 18/231 |
| 2021/0390316 A1* | 12/2021 | Schoneveld | G06V 20/41 |
| 2022/0156587 A1* | 5/2022 | Ebrahimpour | G06N 3/08 |
| 2022/0180625 A1* | 6/2022 | Ahn | G06V 10/82 |
| 2022/0189143 A1* | 6/2022 | Xie | G06V 10/765 |
| 2022/0207377 A1* | 6/2022 | Zhang | G06V 40/10 |
| 2022/0224508 A1* | 7/2022 | Sirdey | G06F 21/6254 |
| 2022/0292805 A1* | 9/2022 | Feng | G06N 7/01 |
| 2022/0301712 A1* | 9/2022 | Kim | G06T 7/11 |
| 2022/0309661 A1* | 9/2022 | Ye | G06T 7/73 |
| 2022/0382553 A1* | 12/2022 | Li | G06F 9/3836 |
| 2022/0383037 A1* | 12/2022 | Pham | G06N 3/09 |
| 2022/0383662 A1* | 12/2022 | Javan Roshtkhari | G06N 3/08 |
| 2023/0010392 A1* | 1/2023 | Hsiao | G06V 20/49 |
| 2023/0017072 A1* | 1/2023 | Arnab | G06V 20/49 |
| 2023/0153393 A1* | 5/2023 | Kudo | G06F 18/24147 707/737 |
| 2023/0394783 A1* | 12/2023 | Matsunaga | G06V 10/761 |

OTHER PUBLICATIONS

2Shankar, et al., "Discovering Motor Programs by Recomposing Demonstrations", In ICLR, 2020, 12 pages.

3He, et al., "Deep Residual Learning for Image Recognition", In Proceedings of the IEEE Conference on Computer Vision and Pattern Recognition, pp. 770-778, 2016.

4Miech, et al., "HowTo100M: Learning a Text-Video Embedding by Watching Hundred Million Narrated Video Clips", In ICCV, pp. 2630-2640, 2019.

* cited by examiner

A: Heat a pan add 1 spoon oil and prosciutto to it. add onions butter chopped parsley and salt to it and keep stirring pull the pan off fire and add some vodka. wait for the flame off and add marinara sauce and some cream to the pan and cook for some seconds $zH_1$ — 1510, 1500
$zH_2$ — Boil Pasta
$zH_3$ — Pour Sauce
$zH_4$ — Garnish with Parmesan

B: Heat a pan add 1 spoon oil and prosciutto to it. add onions butter chopped parsley and salt to it and keep stirring $zH_1$ — 1500
$zH_2$ — Pull the pan off fire and add some vodka — 1500
$zH_3$ — Add marinara sauce and some cream to the pan and cook for some seconds.. — 1505
$zH_4$ — Strain some boiled pasta pour the sauce on it and garnish with parmesan cheese — 1505

FIG. 15

SELF-SUPERVISED HIERARCHICAL EVENT REPRESENTATION LEARNING

BACKGROUND

The following relates generally to video processing, and more specifically to video processing using representation learning.

Representation learning refers to the use of a computer to train a machine learning model that can automatically discover representations for feature detection or classification from raw data. A machine learning model may be either supervised or unsupervised, i.e., features are learned using labeled input data or unlabeled input data. In some examples, representation learning trains a machine learning model to predict user behavior from user action sequences (e.g., clicking an item, adding item to cart, etc.). Temporal event representation is a sub-task in representation learning. Conventional models may handle short horizon tasks using decision-making algorithms.

However, these conventional models depend on large training datasets with expensive human annotations for time-stamps corresponding to the events and fail to identify the hierarchy of event information. Therefore, there is a need in the art for an improved video processing system that can be trained to identify low-level and high-level events in a long horizon task (e.g., a video).

SUMMARY

The present disclosure describes systems and methods for video processing. Embodiments of the disclosure provide a video processing apparatus trained using machine learning to identify high-level events occurring in a video. In some examples, the video processing apparatus is trained using unsupervised learning to identify a hierarchy of events such as low-level events and high-level events, where multiple low-level events may form a corresponding high-level event. A high-level image encoder of the video processing apparatus generates a set of high-level event representation vectors based on low-level event representation vectors. A number of the high-level event representation vectors is less than the number of the low-level event representation vectors.

A method, apparatus, and non-transitory computer readable medium for video processing are described. One or more embodiments of the method, apparatus, and non-transitory computer readable medium include generating a plurality of image feature vectors corresponding to a plurality of frames of a video; generating a plurality of low-level event representation vectors based on the plurality of image feature vectors, wherein a number of the low-level event representation vectors is less than a number of the image feature vectors; generating a plurality of high-level event representation vectors based on the plurality of low-level event representation vectors, wherein a number of the high-level event representation vectors is less than the number of the low-level event representation vectors; and identifying a plurality of high-level events occurring in the video based on the plurality of high-level event representation vectors.

A method, apparatus, and non-transitory computer readable medium for training a neural network are described. One or more embodiments of the method, apparatus, and non-transitory computer readable medium include generating a plurality of image feature vectors corresponding to a plurality of frames of a video; generating a plurality of low-level event representation vectors based on the plurality of image feature vectors, wherein a number of the low-level event representation vectors is less than a number of the image feature vectors; generating a plurality of high-level event representation vectors based on the plurality of low-level event representation vectors, wherein a number of the high-level event representation vectors is less than the number of the low-level event representation vectors; decoding the plurality of high-level event representation vectors to obtain a plurality of output feature vectors, wherein a number of the output feature vectors is greater than the number of the high-level event representation vectors; computing an unsupervised learning loss based on the plurality of image feature vectors and the output feature vectors; and updating parameters of a neural network based on the unsupervised learning loss.

An apparatus and method for video processing are described. One or more embodiments of the apparatus and method include an image encoder configured to generate a plurality of image feature vectors corresponding to a plurality of frames of a video; a low-level image encoder configured to generate a plurality of low-level event representation vectors based on the plurality of image feature vectors, wherein a number of the low-level event representation vectors is less than a number of the image feature vectors; a high-level image encoder configured to generate a plurality of high-level event representation vectors based on the plurality of low-level event representation vectors, wherein a number of the high-level event representation vectors is less than the number of the low-level event representation vectors; and an event identification component configured to identify a plurality of high-level events occurring in the video based on the plurality of high-level event representation vectors.

BRIEF DESCRIPTION OF THE DRAWINGS

FIG. 15 shows an example of representation learning guided by commentary according to aspects of the present disclosure.

DETAILED DESCRIPTION

Figure 1:
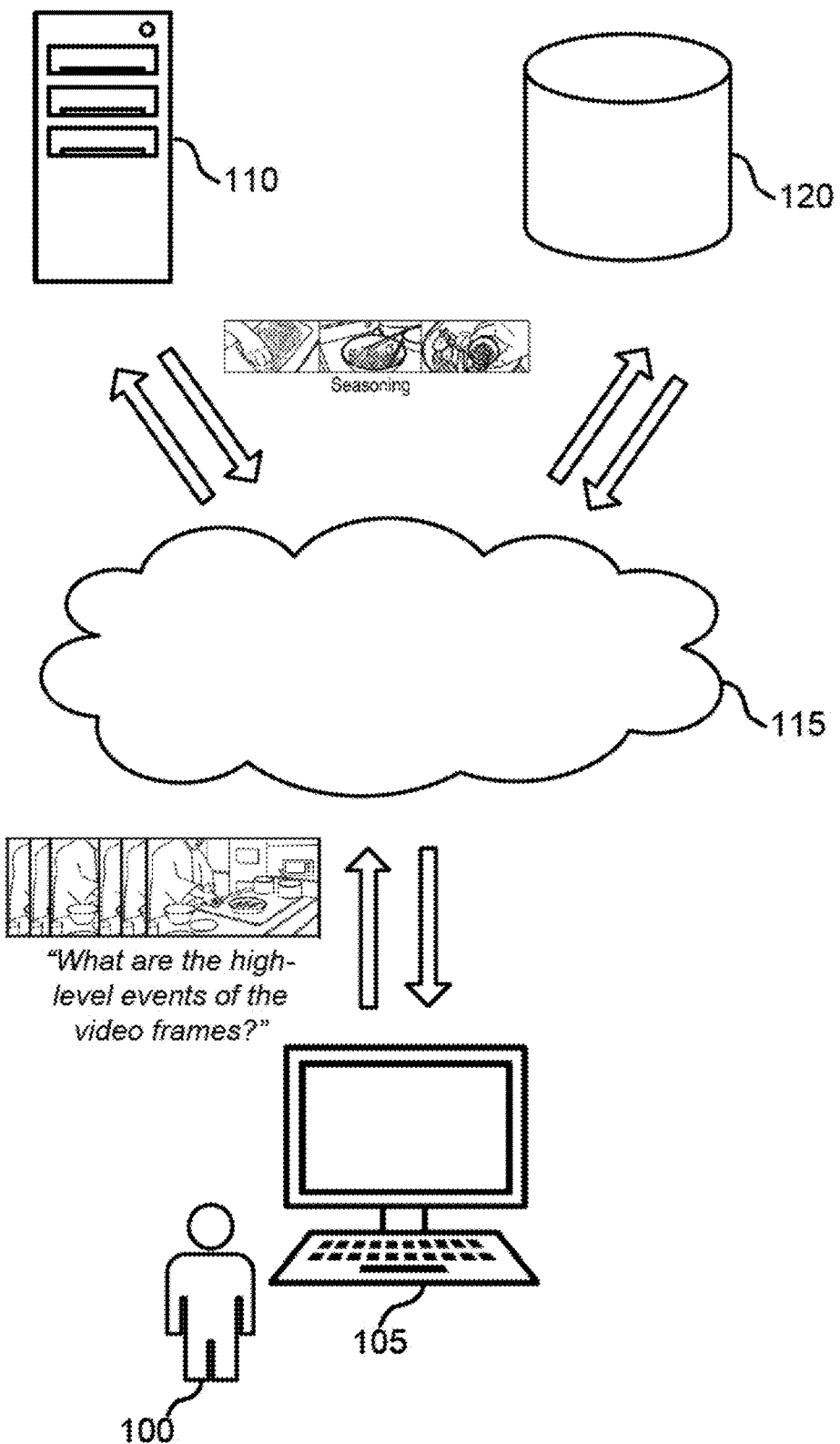
FIG. 1 shows an example of a video processing system according to aspects of the present disclosure.

The present disclosure describes systems and methods for video processing. Embodiments of the disclosure provide a video processing apparatus trained using machine learning to identify high-level events occurring in a video. In some examples, the video processing apparatus is trained using unsupervised learning to identify a hierarchy of events such as low-level events and high-level events, where multiple low-level events may form a corresponding high-level event. A high-level image encoder of the video processing apparatus generates a set of high-level event representation vectors based on low-level event representation vectors. According to some embodiments, an alignment component of the video processing apparatus can align text with the video frames by performing time warping based on the high-level event representation vectors and the high-level text representation vectors.

Recently, machine learning models have been trained such that agents learn simple tasks from demonstrations. In some cases, agents may be trained to maximize an external reward using a large corpus of data. The agents learn trajectories of states on a corpus of interaction data, i.e., trajectories of state-action pairs. However, conventional models and decision-making algorithms are limited to short horizon tasks. These models cannot handle a long-horizon task such as videos. Additionally, these systems depend on a large number of training data (e.g., annotations for timestamps that correspond to each temporal event). As a result, training the models is expensive and labor extensive.

Embodiments of the present disclosure include a video processing apparatus that can identify a hierarchy of event information in a video. For example, the hierarchy of event information includes low-level events and high-level events, such that a set of the low-level events form a corresponding high-level event. In some embodiments, the apparatus is trained using unsupervised learning to eliminate the need for large annotated training sets. As a result, a video processing apparatus is trained to convert video frames and text description into semantically meaningful and hierarchical embedding space using fewer ground truth annotations than conventional systems.

According to an embodiment, a self-supervised representation learning is used to train a video processing network that can abstract low-level events and high-level events occurring in a video. A text encoder of the network (e.g., BERT) converts text to word embeddings while an image encoder of the network (e.g., ResNet) converts video frames into image feature vectors. A high-level image encoder generates a set of high-level event representation vectors based on low-level event representation vectors. A number of the high-level event representation vectors is less than the number of the low-level event representation vectors.

By applying an unconventional method of cross-modal decoding, embodiments of the present disclosure can identify high-level and composite tasks. For example, the video processing apparatus can segment a set of video frames into semantically meaningful sub sequences (i.e., identifying a set of low-level and high-level events occurring in the video) representing high-level and low-level tasks. For example, the apparatus can identify a set of user action sequences from an image editing demo video (e.g., "visiting a filters section", "applying a blur", and "using neural filters feature"). These low-level events may form a high-level event such as "filtering an image".

Embodiments of the present disclosure may be used in the context of video processing applications. For example, a video processing network based on the present disclosure may take a set of video frames and efficiently identify low-level event and high-level event information for subsequent user manipulation. An example application of the inventive concept in the video processing context is provided with reference to FIGS. 1-4. Details regarding the architecture of an example video processing apparatus are provided with reference to FIGS. 5-7. Example processes for video processing are provided with reference to FIGS. 8-12. Example training processes are described with reference to FIGS. 13-17.

Video Processing Application

FIG. 1 shows an example of a video processing system according to aspects of the present disclosure. The example shown includes user 100, user device 105, video processing apparatus 110, cloud 115, and database 120. Video processing apparatus 110 is an example of, or includes aspects of, the corresponding element described with reference to FIGS. 3 and 5.

In an example of FIG. 1, user 100 selects a video including a set of frames. The video frames may come from a cooking tutorial video and form a task such as cooking. The frames include multiple steps for cooking such as preparation, seasoning, frying, and pouring while frying (see FIG. 4 below). User 100 is interested in identifying low-level events and high-level events for cooking for subsequent manipulation. The user 100 communicates with video processing apparatus 110 via the user device 105 and the cloud 115. The user device 105 transmits the video frames to the video processing apparatus 110 to identify high-level events occurring in the video.

The user device 105 may be a personal computer, laptop computer, mainframe computer, palmtop computer, personal assistant, mobile device, or any other suitable processing apparatus. In some examples, the user device 105 includes software that incorporates a video processing application (e.g., a video editing application). In some examples, the video editing application on the user device 105 may include functions of the video processing apparatus 110.

A user interface may enable a user 100 to interact with a user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

The video processing apparatus 110 receives a set of frames of a video and generates a set of image feature vectors corresponding to the set of frames. A low-level image encoder generates low-level event representation vectors based on the set of image feature vectors, where a number of the low-level event representation vectors is less than a number of the image feature vectors. A high-level image encoder generates high-level event representation vectors based on the set of low-level event representation vectors, where a number of the high-level event representation vectors is less than the number of the low-level event representation vectors. The video processing apparatus 110 identifies a high-level event occurring in the video, e.g., seasoning. Seasoning may include multiple low-level events such as pouring sauce on salad, stirring up the sauce, etc. The video processing apparatus 110 returns the high-level event information (e.g., frames corresponding to seasoning) to user 100. The process of using the video processing apparatus 110 is further described with reference to FIG. 2.

The video processing apparatus 110 includes a computer implemented network comprising an image encoder, a low-level image encoder, a high-level image encoder, an event identification component, and an image output decoder. In some examples, the video processing apparatus 110 further includes an event representation decoder, a text encoder, a low-level text encoder, a high-level text encoder, and an alignment component.

The video processing apparatus 110 may also include a processor unit, a memory unit, an I/O module, and a training component. The training component is used to train a machine learning model (or a video processing network). Additionally, the video processing apparatus 110 can communicate with the database 120 via the cloud 115. In some cases, the architecture of the video processing network is also referred to as a network or a network model. Further detail regarding the architecture of the video processing apparatus 110 is provided with reference to FIGS. 5-6. Further detail regarding the operation of the video processing apparatus 110 is provided with reference to FIGS. 7-12.

In some cases, the video processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
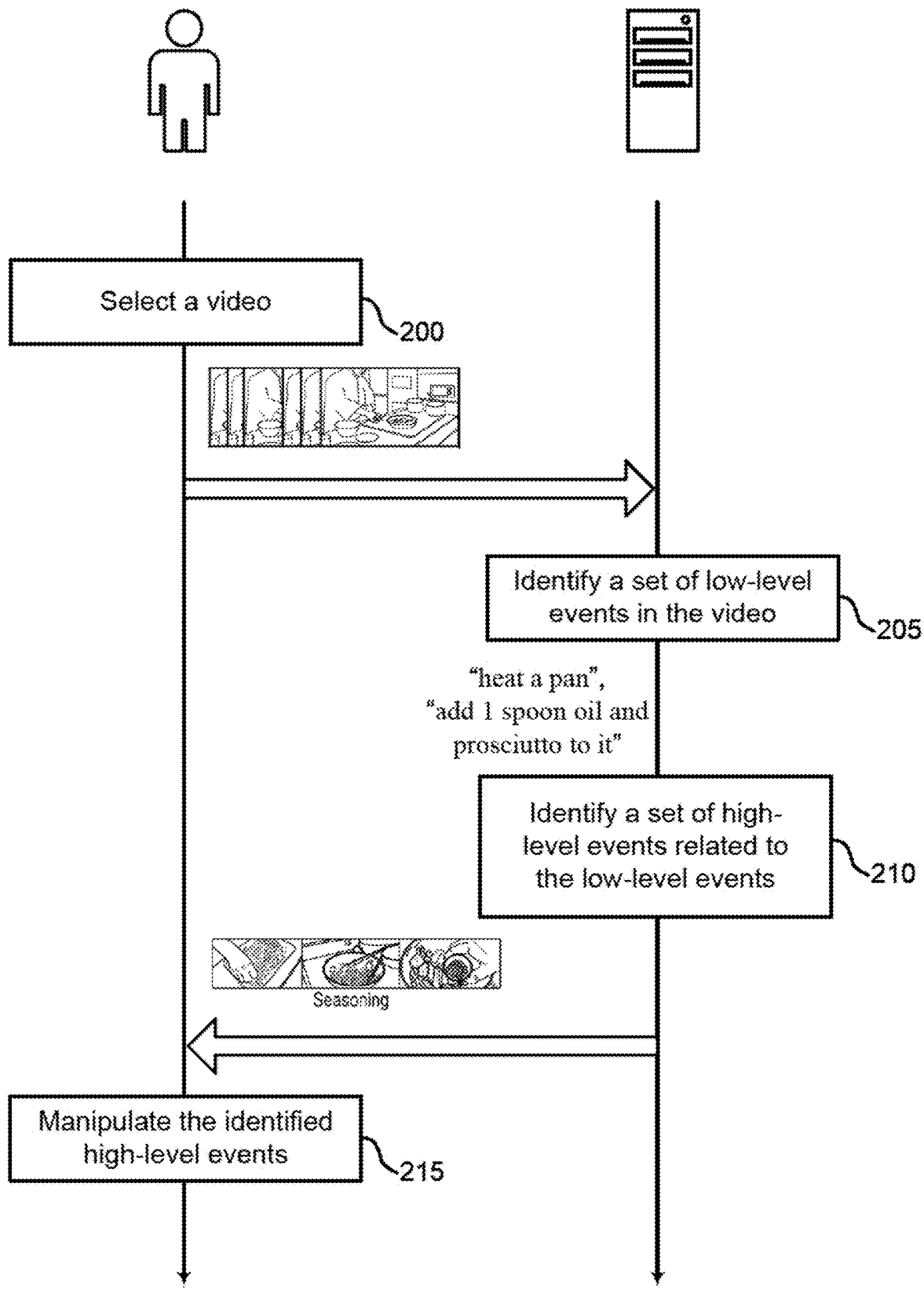
FIG. 2 shows an example of identifying low-level events and high-level events in a video according to aspects of the present disclosure.

FIG. 2 shows an example of identifying low-level events and high-level events in a video according to aspects of the present disclosure. The video processing apparatus can be used to identify high-level events based on a video selected by a user. In some examples, a user is interested in identifying a hierarchy of events information based on the video frames. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user selects a video. In some cases, the operations of this step refer to, or may be performed by, a user as described with reference to FIG. 1. In some examples, the video includes a set of frames. The video can be seen as a long-horizon sequence of images. For example, the video may be a cooking tutorial.

At operation 205, the system identifies a set of low-level events. In some cases, the operations of this step refer to, or may be performed by, a video processing apparatus as described with reference to FIGS. 1, 3, and 5.

The long-horizon sequence of images demonstrate a complex cooking task and the associated textual commentary. The system can isolate semantically meaningful sub sequences (i.e., low-level events). The cooking events sequence discovered by the system include "heat a pan," "add 1 spoon oil and prosciutto to it." It is a common sequence of steps for cooking Italian dishes. Other sub-sequential patterns discovered include "pull the pan off the fire" and "add some vodka," which is a common sequential pattern for cooking.

At operation 210, the system identifies a set of high-level events related to the set of low-level events. In some cases, the operations of this step refer to, or may be performed by, a video processing apparatus as described with reference to FIGS. 1, 3, and 5.

In some examples, the set of high-level events for cooking may include boiling, frying, pouring, etc. Alternatively or additionally, high-level events include preparatory steps, seasoning steps, frying steps, and pouring while frying steps. The low-level events and high-level events are hierarchical in nature, i.e., low-level events are building blocks for high-level events.

At operation 215, the user manipulates the identified high-level events. In some cases, the operations of this step refer to, or may be performed by, a user as described with reference to FIG. 1. The high-level event (e.g., seasoning) is returned to the user. The user can re-generate the video frames corresponding to the lower events within the seasoning step/event. For example, seasoning steps include adding pepper, pouring sauce into a bowl of salad, and stirring up the pepper and sauce.

Figure 3:
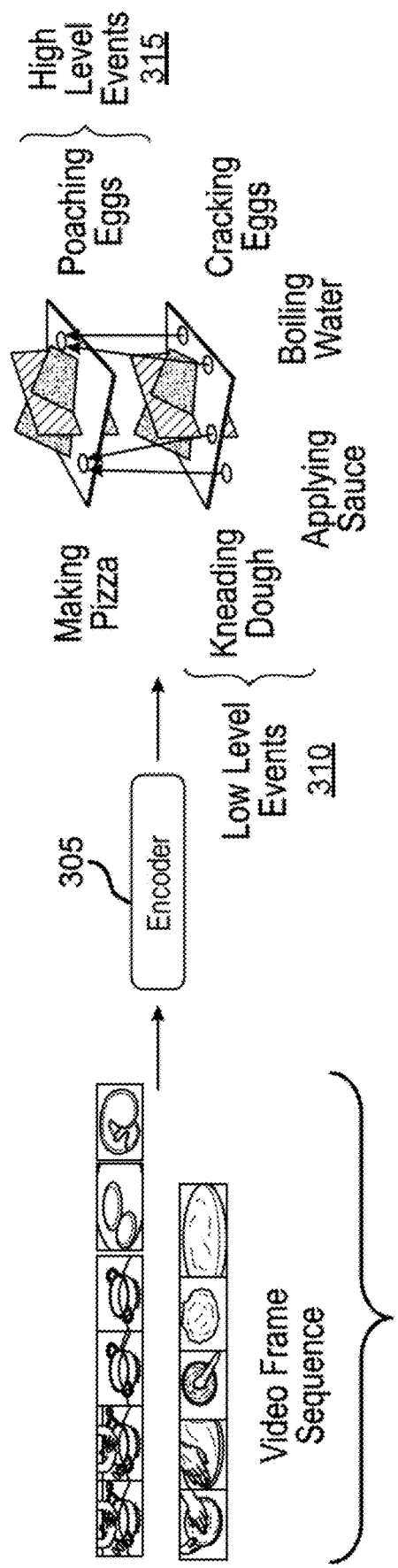
FIG. 3 shows an example of identifying high-level events and low-level events in a video according to aspects of the present disclosure.

FIG. 3 shows an example of identifying high-level events 315 and low-level events 310 in a video according to aspects of the present disclosure. High-level events 315 are related to low-level events 310 according to an event hierarchy. The example shown includes video frames 300, video processing apparatus 305, low-level events 310, and high-level events 315.

As an example in FIG. 3, a long horizon task in the domain of cooking involves an eggs benedict recipe. The recipe may include multiple low-level events 310 such as boiling water, addition of eggs to water, etc. Multiple low-level events 310 are combined to create a high-level event 315. For example, a high-level event 315 may be poaching an egg, which further includes low-level events 310 such as boiling water, addition of egg to water, and removal after two minutes of cooking. The video processing network learns embeddings for these low-level events 310 and high-level events 315.

Video frames 300 are an example of, or includes aspects of, the corresponding elements described with reference to FIGS. 7, 9, 13, and 15. Video processing apparatus 305 is an example of, or includes aspects of, the corresponding element described with reference to FIGS. 1 and 5. Low-level events 310 are an example of, or includes aspects of, the corresponding element described with reference to FIGS. 4, 9, 10, and 15. High-level events 315 are an example of, or includes aspects of, the corresponding element described with reference to FIGS. 4, 9, and 10.

Figure 4:
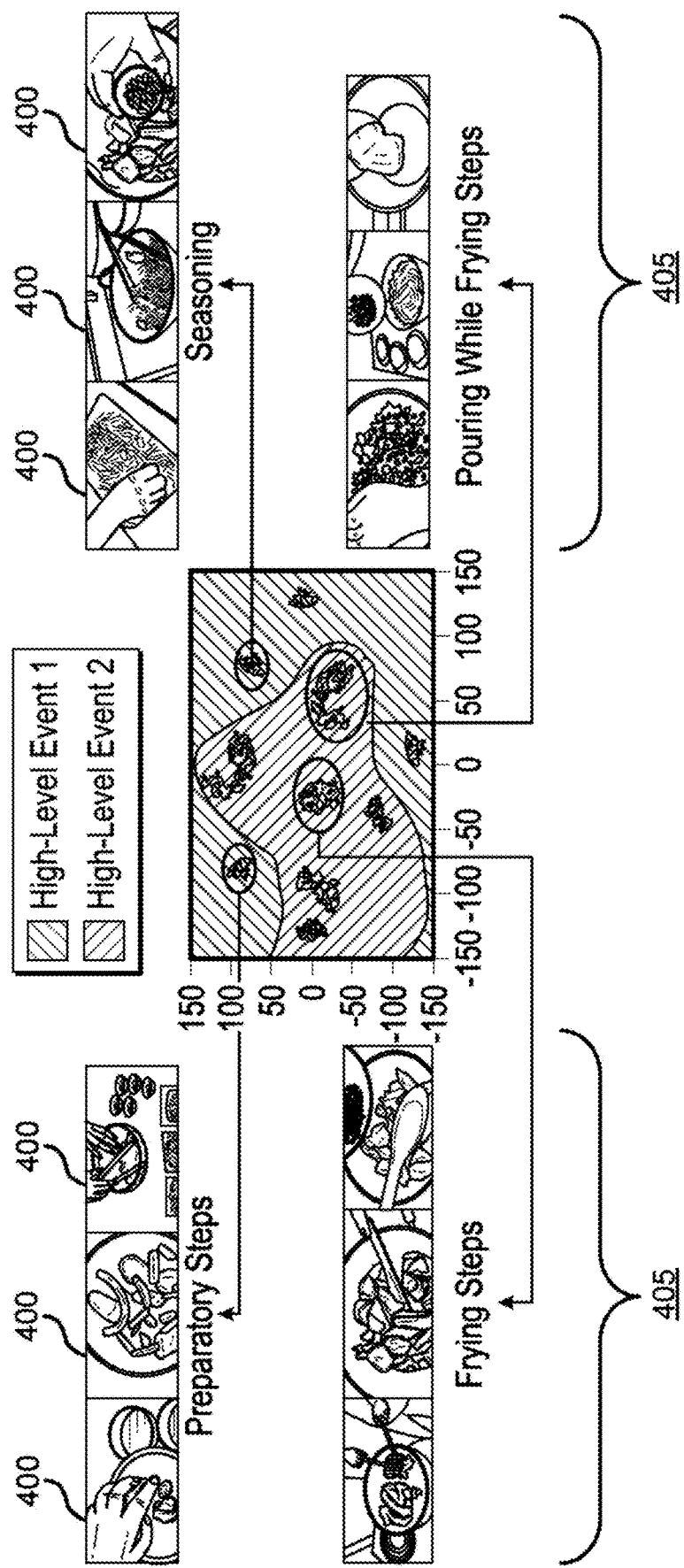
FIG. 4 shows an example of clusters of low-level events and corresponding high-level mappings according to aspects of the present disclosure.

FIG. 4 shows an example of clusters of low-level events 400 and corresponding high-level mappings according to aspects of the present disclosure. The video processing apparatus (as described in FIG. 1) can generate high-level event representation vectors based on vector representations corresponding to low-level events 400. The example shown includes low-level events 400 and high-level events 405.

Humans are capable of subconsciously abstracting events from a complex task, for example, cooking that may include multiple steps/events such as boiling, frying, pouring, etc. The abstracted events succinctly encode sub-sequences in such demonstrations. The events can be hierarchical, i.e., lower-level events are building-blocks for higher-level events. In some examples, a subset of the lower-level events forms a corresponding high-level event. Embodiments of the present disclosure include an end-to-end trainable architecture based on sequence-to-sequence learning (or known as seq2seq). A self-supervised hierarchical event representation learning network model is trained for multi-modal hierarchical representation learning from demonstrations (e.g., videos).

FIG. 4 illustrates low-level events 400 and their corresponding high-level mappings for high-level events 405 discovered by the video processing network on the You-Cook2 dataset. The network obtains clusters of low-level events such as frying, pouring while frying, applying seasoning, etc. The network also obtains two high-level events that correspond to events that need heating and those that do not need heating.

Low-level events 400 is an example of, or includes aspects of, the corresponding element described with reference to FIGS. 3, 9, 10, and 15. High-level events 405 is an example of, or includes aspects of, the corresponding element described with reference to FIGS. 3, 9, and 10.

Architecture

Figure 5:
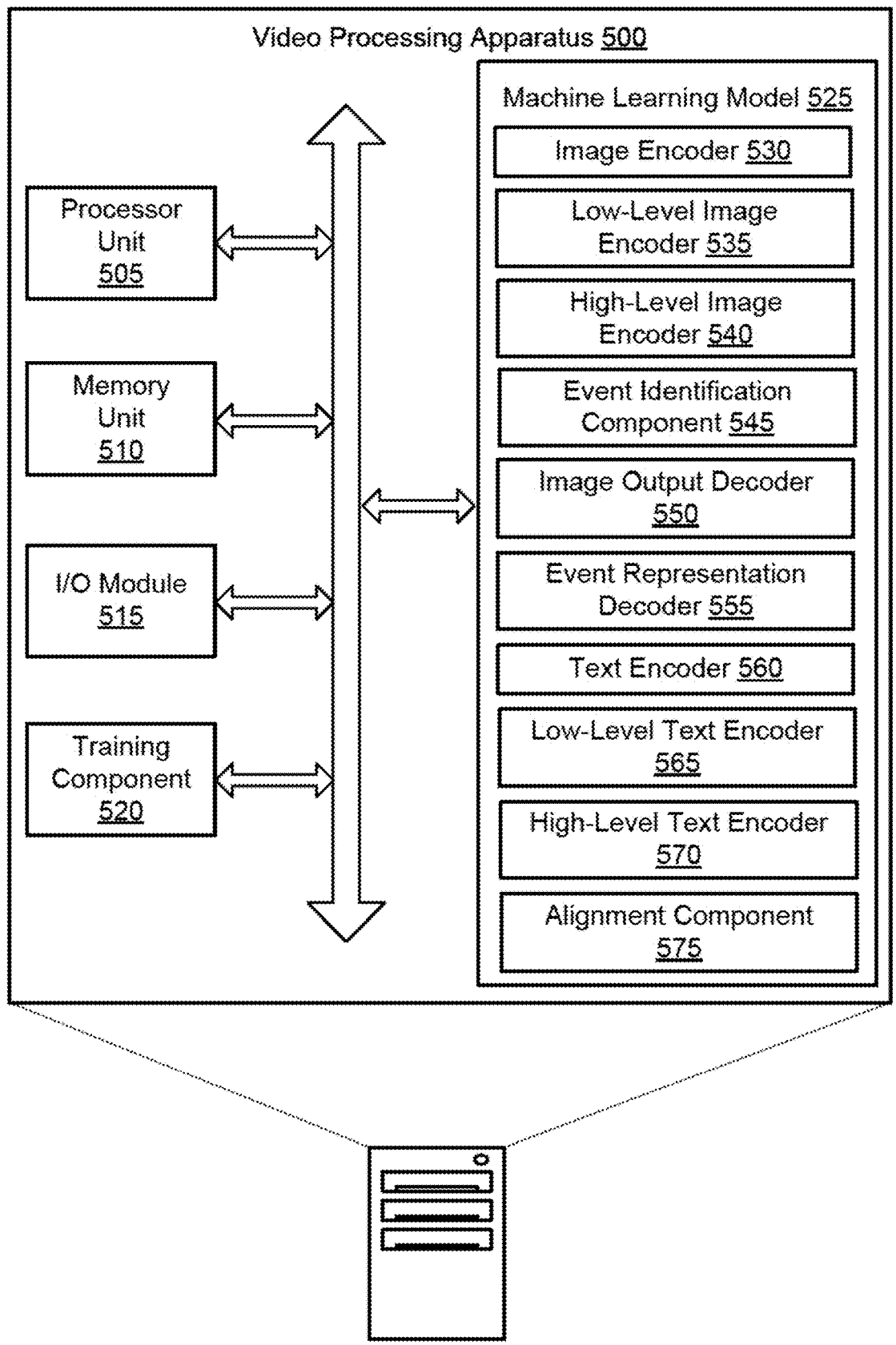
FIG. 5 shows an example of a video processing apparatus according to aspects of the present disclosure.
Figure 6:
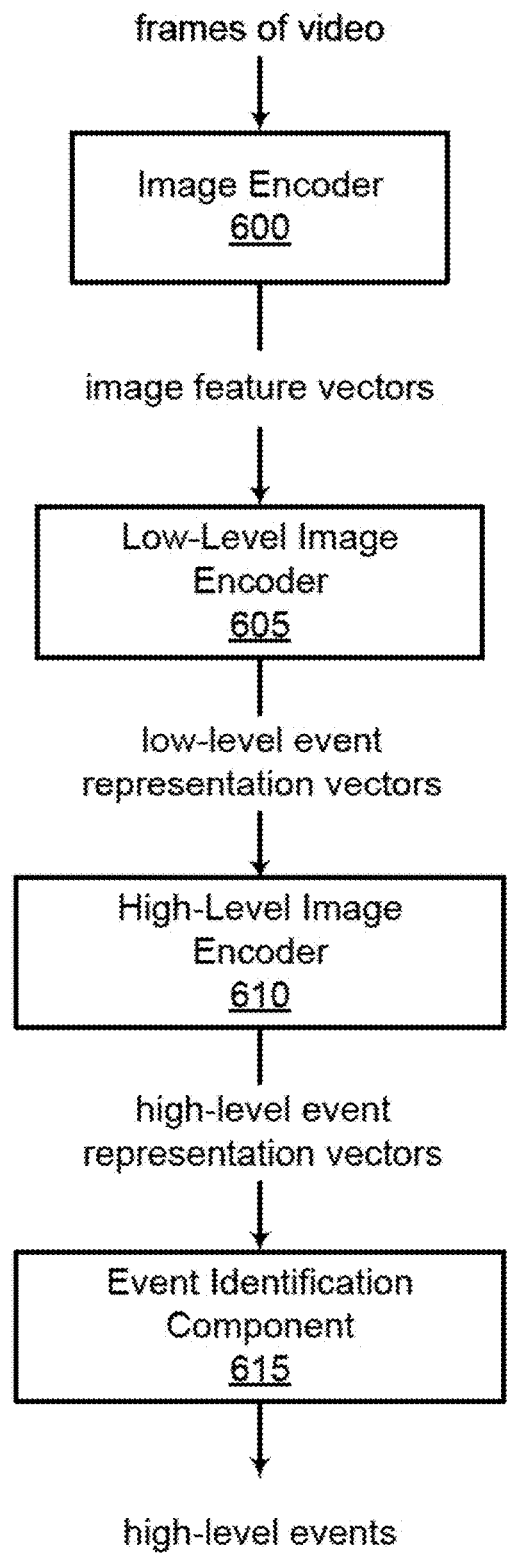
FIG. 6 shows an example of a video processing diagram according to aspects of the present disclosure.
Figure 7:
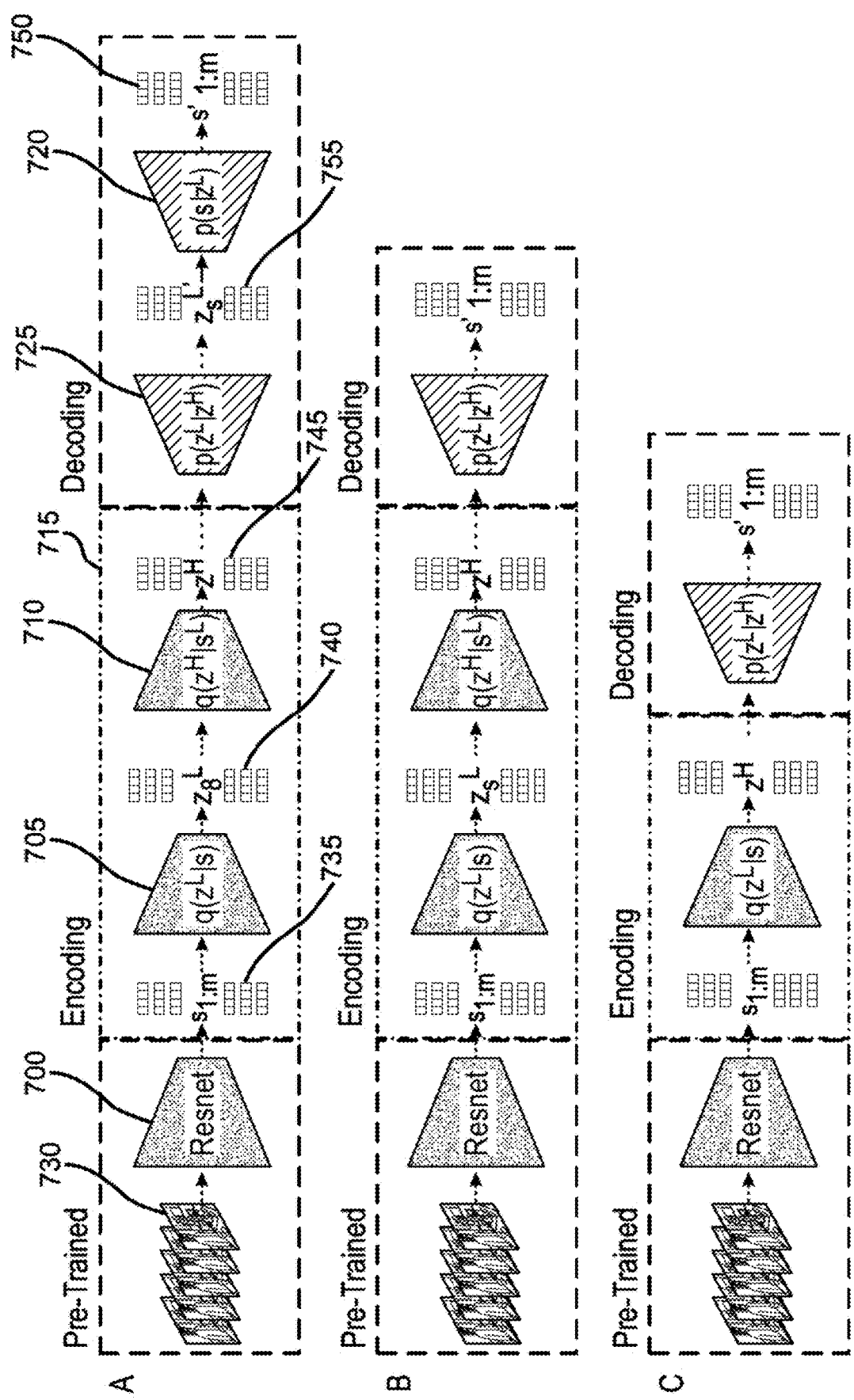
FIG. 7 shows an example of a video processing system based on event representation according to aspects of the present disclosure.

In FIGS. 5-7, an apparatus and a method for video processing is described. One or more embodiments of the apparatus include an image encoder configured to generate a plurality of image feature vectors corresponding to a plurality of frames of a video; a low-level image encoder configured to generate a plurality of low-level event representation vectors based on the plurality of image feature vectors, wherein a number of the low-level event representation vectors is less than a number of the image feature vectors; a high-level image encoder configured to generate a plurality of high-level event representation vectors based on the plurality of low-level event representation vectors, wherein a number of the high-level event representation vectors is less than the number of the low-level event representation vectors; and an event identification component configured to identify a plurality of high-level events occurring in the video based on the plurality of high-level event representation vectors.

Some examples of the apparatus and method further include an image output decoder configured to decode the plurality of high-level event representation vectors to obtain a plurality of output feature vectors, wherein a number of the output feature vectors is greater than the number of the high-level event representation vectors.

Some examples of the apparatus and method further include an event representation decoder configured to decode the plurality of high-level event representation vectors to obtain a plurality of output low-level event representation vectors, wherein a number of the output low-level event representation vectors is greater than the number of the high-level event representation vectors, and wherein the plurality of output feature vectors are generated based on the plurality of output low-level event representation vectors.

Some examples of the apparatus and method further include a text encoder configured to generate a plurality of word vectors based on text describing the video. Some examples further include a low-level text encoder configured to generate a plurality of low-level text representation vectors based on the plurality of word vectors, wherein a number of the low-level text representation vectors is less than a number of the word vectors. Some examples further include a high-level text encoder configured to generate a plurality of high-level text representation vectors based on the plurality of low-level text representation vectors, wherein a number of the high-level text representation vectors is less than the number of the low-level text representation vectors.

Some examples of the apparatus and method further include an alignment component configured to align the text with the plurality of frames of the video by performing time warping based on the plurality of high-level event representation vectors and the plurality of high-level text representation vectors.

FIG. 5 shows an example of a video processing apparatus according to aspects of the present disclosure. The example video processing apparatus 500 shown includes processor unit 505, memory unit 510, I/O module 515, training component 520, and machine learning model 525. Machine learning model 525 further includes image encoder 530, low-level image encoder 535, high-level image encoder 540, event identification component 545, image output decoder 550, event representation decoder 555, text encoder 560, low-level text encoder 565, high-level text encoder 570, and alignment component 575. Video processing apparatus 500 is an example of, or includes aspects of, the corresponding element described with reference to FIGS. 1 and 3.

A processor unit 505 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 505 is configured to operate a memory array using a memory controller. In other cases, a memory controller is integrated into the processor. In some cases, the processor unit 505 is configured to execute computer-readable instructions stored in a memory to perform various functions. In some embodiments, a processor unit 505 includes special purpose components for modem processing, baseband processing, digital signal processing, or transmission processing.

Examples of a memory unit 510 include random access memory (RAM), read-only memory (ROM), or a hard disk. Examples of memory unit 510 include solid state memory and a hard disk drive. In some examples, a memory unit 510 is used to store computer-readable, computer-executable software including instructions that, when executed, cause a processor to perform various functions described herein. In some cases, the memory unit 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 510 store information in the form of a logical state.

I/O module 515 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 515 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, video processing apparatus 500 includes a computer implemented artificial neural network (ANN) for identifying high-level events and their respective vector representations occurring in a video. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, video processing apparatus 500 includes a convolutional neural network (CNN) for video processing. CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 520 computes an unsupervised learning loss based on the set of image feature vectors and the output feature vectors. Training component 520 updates parameters of a neural network based on the unsupervised learning loss. In some examples, training component 520 compares each of the set of output feature vectors to a corresponding feature vector of the set of image feature vectors to obtain the unsupervised learning loss. In some examples, training component 520 compares each of the output low-level event representation vectors to a corresponding low-level event representation vector of the set of low-level event representation vectors to obtain the unsupervised learning loss. In some examples, training component 520 compares the set of text output feature vectors to the set of image feature vectors to obtain the unsupervised learning loss. In some examples, training component 520 compares the set of output feature vectors to the set of word vectors to obtain the unsupervised learning loss. In some examples, training component 520 computes a dynamic time warping loss based on the alignment, where the parameters of the neural network are updated based on the dynamic time warping loss.

According to some embodiments, machine learning model 525 generates a text description of the video based on the set of output feature vectors. In some examples, machine learning model 525 down-samples the video to obtain the set of frames. According to some aspects, machine learning model 525 decodes the set of high-level text representation vectors to obtain a set of text output feature vectors, where a number of the text output feature vectors is greater than the number of the high-level text representation vectors.

According to some embodiments, image encoder 530 generates a set of image feature vectors corresponding to a set of frames of a video. Image encoder 530 is an example of, or includes aspects of, the corresponding element described with reference to FIGS. 6, 7, and 13.

According to some embodiments, low-level image encoder 535 generates a set of low-level event representation vectors based on the set of image feature vectors, where a number of the low-level event representation vectors is less than a number of the image feature vectors. Low-level image encoder 535 is an example of, or includes aspects of, the corresponding element described with reference to FIGS. 6, 7, and 13.

According to some embodiments, high-level image encoder 540 generates a set of high-level event representation vectors based on the set of low-level event representation vectors, where a number of the high-level event representation vectors is less than the number of the low-level event representation vectors. In some examples, high-level image encoder 540 generates a set of higher-level event representation vectors based on the set of high-level event representation vectors, where a number of the higher-level event representation vectors is less than the number of the high-level event representation vectors, where the set of high-level events are identified based on the set of higher-level event representation vectors. High-level image encoder 540 is an example of, or includes aspects of, the corresponding element described with reference to FIGS. 6, 7, and 13.

According to some embodiments, event identification component 545 identifies a set of high-level events occurring in the video based on the set of high-level event representation vectors. In some examples, event identification component 545 identifies a set of low-level events occurring in the video based on the set of low-level event representation vectors, where the set of low-level events are related to the set of high-level events according to an event hierarchy. Event identification component 545 is an example of, or includes aspects of, the corresponding element described with reference to FIGS. 6, 7, and 13.

According to some embodiments, image output decoder 550 decodes the set of high-level event representation vectors to obtain a set of output feature vectors, where a number of the output feature vectors is greater than the number of the high-level event representation vectors. Image output decoder 550 is an example of, or includes aspects of, the corresponding element described with reference to FIGS. 7 and 13.

According to some embodiments, event representation decoder 555 decodes the set of high-level event representation vectors to obtain a set of output low-level event representation vectors, where a number of the output low-level event representation vectors is greater than the number of the high-level event representation vectors, and where the set of output feature vectors are generated based on the set of output low-level event representation vectors. Event representation decoder 555 is an example of, or includes aspects of, the corresponding element described with reference to FIG. 13.

According to some embodiments, text encoder 560 generates a set of word vectors based on text describing the video. Text encoder 560 is an example of, or includes aspects of, the corresponding element described with reference to FIG. 13.

According to some embodiments, low-level text encoder 565 generates a set of low-level text representation vectors based on the set of word vectors, where a number of the low-level text representation vectors is less than a number of the word vectors. Low-level text encoder 565 is an example of, or includes aspects of, the corresponding element described with reference to FIG. 13.

According to some embodiments, high-level text encoder 570 generates a set of high-level text representation vectors based on the set of low-level text representation vectors, where a number of the high-level text representation vectors is less than a number of the low-level text representation vectors. High-level text encoder 570 is an example of, or includes aspects of, the corresponding element described with reference to FIG. 13.

According to some embodiments, alignment component 575 aligns the text with the plurality of frames of the video by performing time warping based on the set of high-level event representation vectors and the set of high-level text representation vectors. Alignment component 575 is an example of, or includes aspects of, the corresponding element described with reference to FIG. 13.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 6 shows an example of a video processing diagram according to aspects of the present disclosure. The video processing diagram of FIG. 6 shows the relationship between networks or elements of the machine learning model described with reference to FIG. 5. The example shown includes image encoder 600, low-level image encoder 605, high-level image encoder 610, and event identification component 615.

As an example illustrated in FIG. 6, image encoder 600 generates a set of image feature vectors corresponding to a set of frames of a video (e.g., a cooking tutorial video as shown in FIG. 3). Image encoder 600 is an example of, or includes aspects of, the corresponding element described with reference to FIGS. 5, 7, and 13. The image feature vectors are input to low-level image encoder 605.

Low-level image encoder 605 generates a set of low-level event representation vectors based on the plurality of image feature vectors, where a number of the low-level event representation vectors is less than a number of the image feature vectors. Low-level image encoder 605 is an example of, or includes aspects of, the corresponding element described with reference to FIGS. 5, 7, and 13. The low-level event representation vectors are input to high-level image encoder 610.

High-level image encoder 610 generates a set of high-level event representation vectors based on the low-level event representation vectors, where a number of the high-level event representation vectors is less than the number of the low-level event representation vectors. High-level image encoder 610 is an example of, or includes aspects of, the corresponding element described with reference to FIGS. 5, 7, and 13. The high-level event representation vectors are input to event identification component 615.

Event identification component 615 identifies a set of high-level events occurring in the video based on the set of high-level event representation vectors. Event identification component 615 is an example of, or includes aspects of, the corresponding element described with reference to FIGS. 5, 7, and 13.

FIG. 7 shows an example of a video processing system based on event representation according to aspects of the present disclosure. Example network models shown in FIG. 7 include multiple video processing network variants, i.e., a network without comment, a direct hierarchy variant model, and a FLAT baseline with comment. The direct hierarchy variant directly predicts the sequence of video frames 730 from a high-level event. Detail regarding architecture of the network model at training will be described in FIG. 13. The example shown includes image encoder 700, low-level image encoder 705, high-level image encoder 710, event identification component 715, image output decoder 720, event representation decoder 725, video frames 730, image feature vectors 735, low-level event representation vectors 740, high-level event representation vectors 745, output feature vectors 750, and output low-level event representation vectors 755.

In some examples, the input sequence of video frames 730 may be down-sampled to 200 due to memory. The visual encoder $Z_S^L = z_{0:7}^L \sim q(Z_S^L|S)$ generates a sequence of low-level events such that each low-level event $z_s^L \in \mathbb{R}^{768}$. The sequence of low-level events is further encoded into high-level events using $Z_s^H = z_{0:3}^H \sim q(z_s^H|z_S^L)$ where each $z_s^H \in \mathbb{R}^{768}$.

According to an embodiment, image encoder 700 generates image feature vectors 735 based on video frames 730. Image encoder 700 is an example of, or includes aspects of, the corresponding element described with reference to FIGS. 5, 6, and 13. Image feature vectors 735 are input to low-level image encoder 705. Low-level image encoder 705 generates low-level event representation vectors 740. Low-level image encoder 705 is an example of, or includes aspects of, the corresponding element described with reference to FIGS. 5, 6, and 13.

Low-level event representation vectors 740 are input to high-level image encoder 710. High-level image encoder 710 generates high-level event representation vectors 745. High-level image encoder 710 is an example of, or includes aspects of, the corresponding element described with reference to FIGS. 5, 6, and 13.

High-level event representation vectors 745 are input to event representation decoder 725 to generate output low-level event representation vectors 755. Output low-level event representation vectors 755 are input to image output decoder 720, which then generates output feature vectors 750. Image output decoder 720 is an example of, or includes aspects of, the corresponding element described with reference to FIGS. 5 and 13.

Event identification component 715 is an example of, or includes aspects of, the corresponding element described with reference to FIGS. 5, 6, and 13. Video frames 730 is an example of, or includes aspects of, the corresponding element described with reference to FIGS. 3, 9, 13, and 15. Image feature vectors 735 is an example of, or includes aspects of, the corresponding element described with reference to FIG. 13. Low-level event representation vectors 740 is an example of, or includes aspects of, the corresponding element described with reference to FIG. 13. High-level event representation vectors 745 is an example of, or includes aspects of, the corresponding element described with reference to FIG. 13. Output feature vectors 750 is an example of, or includes aspects of, the corresponding element described with reference to FIG. 13. Output low-level event representation vectors 755 is an example of, or includes aspects of, the corresponding element described with reference to FIG. 13.

Inference

In FIGS. 8-12, a method, apparatus, and non-transitory computer readable medium for video processing are described. One or more embodiments of the method, apparatus, and non-transitory computer readable medium include generating a plurality of image feature vectors corresponding to a plurality of frames of a video; generating a plurality of low-level event representation vectors based on the plurality of image feature vectors, wherein a number of the low-level event representation vectors is less than a number of the image feature vectors; generating a plurality of high-level event representation vectors based on the plurality of low-level event representation vectors, wherein a number of the high-level event representation vectors is less than the number of the low-level event representation vectors; and identifying a plurality of high-level events occurring in the video based on the plurality of high-level event representation vectors.

Some examples of the method, apparatus, and non-transitory computer readable medium further include identifying a plurality of low-level events occurring in the video based on the plurality of low-level event representation vectors, wherein the plurality of low-level events are related to the plurality of high-level events according to an event hierarchy.

Some examples of the method, apparatus, and non-transitory computer readable medium further include generating a plurality of word vectors based on text describing the video. Some examples further include generating a plurality of low-level text representation vectors based on the plurality of word vectors, wherein a number of the low-level text representation vectors is less than a number of the word vectors. Some examples further include generating a plurality of high-level text representation vectors based on the plurality of low-level text representation vectors, wherein a number of the high-level text representation vectors is less than the number of the low-level text representation vectors.

Some examples of the method, apparatus, and non-transitory computer readable medium further include aligning the text with the plurality of frames of the video by performing time warping based on the plurality of high-level event representation vectors and the plurality of high-level text representation vectors. Some examples of the method, apparatus, and non-transitory computer readable medium further include decoding the plurality of high-level event representation vectors to obtain a plurality of output feature vectors, wherein a number of the output feature vectors is greater than the number of the high-level event representation vectors. Some examples further include generating a text description of the video based on the plurality of output feature vectors.

Some examples of the method, apparatus, and non-transitory computer readable medium further include generating a plurality of higher-level event representation vectors based on the plurality of high-level event representation vectors, wherein a number of the higher-level event representation vectors is less than the number of the high-level event representation vectors, wherein the plurality of high-level events are identified based on the plurality of higher-level event representation vectors. Some examples of the method, apparatus, and non-transitory computer readable medium further include down-sampling the video to obtain the plurality of frames.

Figure 8:
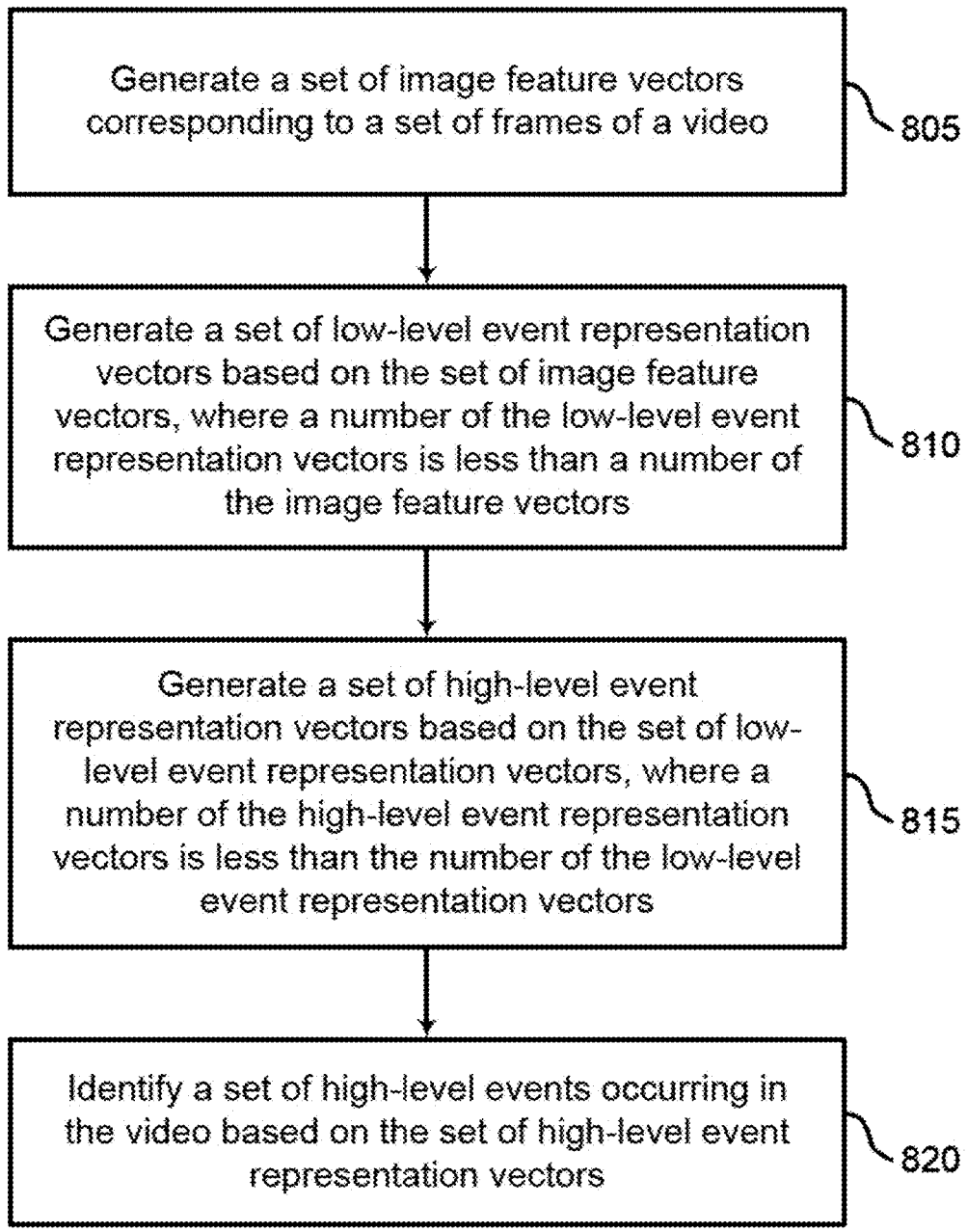
FIG. 8 shows an example of video processing according to aspects of the present disclosure.

FIG. 8 shows an example of video processing according to aspects of the present disclosure. Video processing can be performed by the video processing apparatus and its various components and networks as described in FIGS. 5-7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system generates a set of image feature vectors corresponding to a set of frames of a video. In some cases, the operations of this step refer to, or may be performed by, an image encoder as described with reference to FIGS. 5-7, and 13. According to some embodiments, the video processing network is a multi-modal, hierarchical, sequence-to-sequence model. The network receives a sequence of pre-trained neural network (e.g., ResNet-50) embeddings and a sequence of pre-trained transformer-based (e.g., BERT-base) embeddings as input. In some cases, an "event" refers to a short sequence of states which may occur repeatedly across several demonstration trajectories. Events have an upper limit on the length in time steps. The events can be obtained from a sequence of demonstration images ($S=s_{0:m}$) and/or from the associated textual description ($W=w_{0:n}$).

In some examples, video frames per trajectory are down-sampled to 200 frames. Each frame is encoded using a convolutional neural network or CNN (e.g., ResNet-32 pretrained on MSCOCO dataset) to a 512×1 dimension embedding. Comments are encoded using BERT-base pretrained embeddings with a hidden dimension.

At operation 810, the system generates a set of low-level event representation vectors based on the set of image feature vectors, where a number of the low-level event representation vectors is less than a number of the image feature vectors. In some cases, the operations of this step refer to, or may be performed by, a low-level image encoder as described with reference to FIGS. 5-7, and 13. The low-level events and high-level events are hierarchical in nature. Low-level event representations and high-level event representations are denoted by $z^L$ and $z^H$, respectively. Embodiments of the present disclosure are not limited to two levels in a hierarchy of events. Additionally, embodiments of the present disclosure are not limited to two layers in the encoding phase or the decoding phase as described in FIG. 7 due to the hierarchy of low-level and high-level events.

In some examples, the two modalities are encoded separately by two transformer models into a pair of sequences of low-level latent event embeddings, for example, boiling water or placing eggs in water, derived from a video or text. The low-level sequences are encoded by another pair of transformers that generate sequences of high-level event embeddings (e.g., poaching an egg).

According to an embodiment, each of the modules, i.e., p (z|w), p (z|s), p (s|z), q (w|z) includes a Transformer encoder with 8 hidden layers and 8-head attention. In some examples, the head attention takes a positionally-encoded sequence as input and outputs attention weights.

At operation 815, the system generates a set of high-level event representation vectors based on the set of low-level event representation vectors, where a number of the high-level event representation vectors is less than the number of the low-level event representation vectors. In some cases, the operations of this step refer to, or may be performed by, a high-level image encoder as described with reference to FIGS. 5-7, and 13.

The embedding pairs are aligned through an L2 loss function which ensures that representations correspond to one another. Next, a cross-modal decoding scheme is implemented. For example, visual embeddings are input to decoders to re-generate word or BERT-base embeddings, while textual embeddings are used to generate video frame ResNet embeddings. Detail regarding the cross-modal decoding and training the video processing network will be described below in FIGS. 13-17.

At operation 820, the system identifies a set of high-level events occurring in the video based on the set of high-level event representation vectors. In some cases, the operations of this step refer to, or may be performed by, an event identification component as described with reference to FIGS. 5-7, and 13. The video processing network generates modality and domain invariant embeddings for temporal events after training. The embeddings may be used for event classification and robotic skill learning.

One or more embodiments of the present disclosure include a video processing network trained via self-supervised hierarchical event representation learning. In some cases, the video processing network applies hierarchical multi-modal learning, discovers, and organizes a set of events in a meaningful hierarchy using long-horizon demonstration datasets such as chess openings, cooking, etc. The hierarchy of events is used in predicting textual labels and temporal event segmentations for the associated demonstrations. In some examples, TW-IoU metric indicates that the video processing network outperforms other baseline methods. Detail regarding training and evaluation of the video processing network will be described in FIGS. 13-17.

Figure 9:
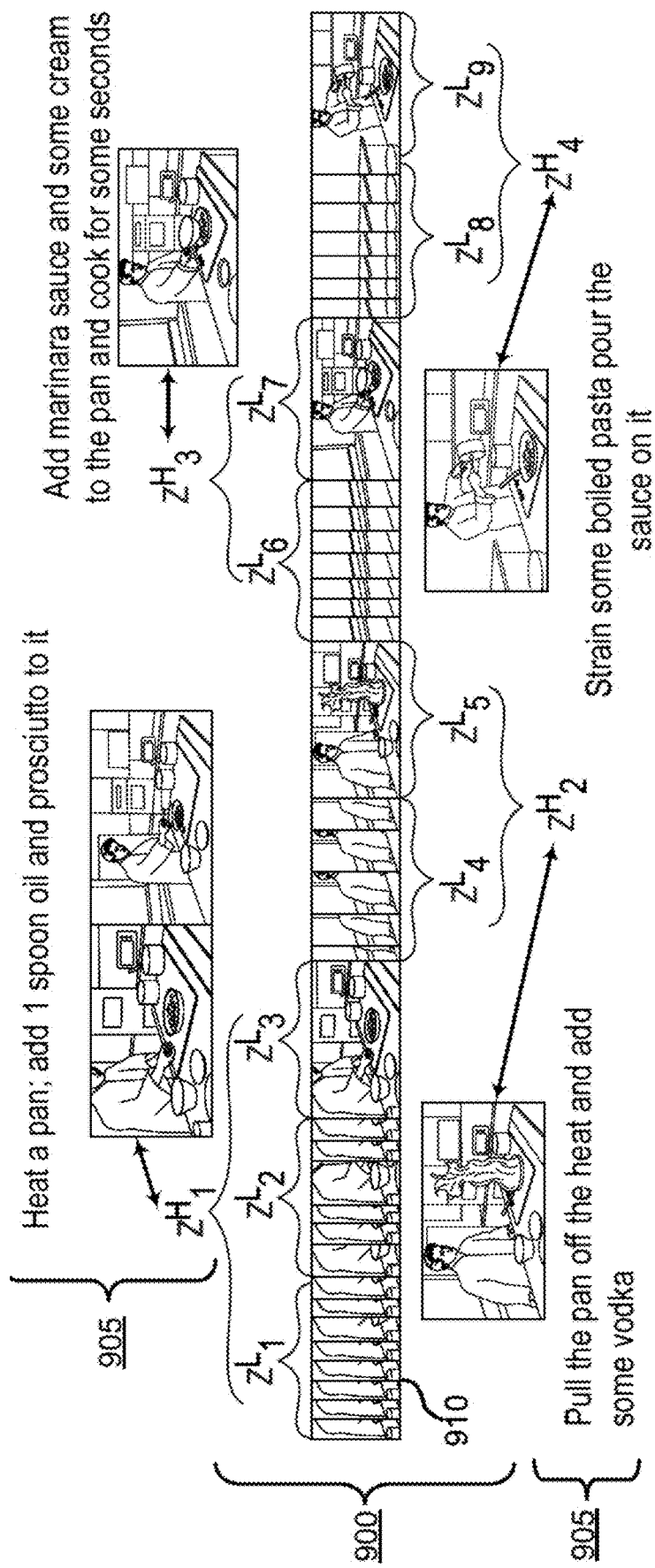
FIG. 9 shows an example of extracting a hierarchy of events based on a video according to aspects of the present disclosure.

FIG. 9 shows an example of extracting a hierarchy of events based on a video according to aspects of the present disclosure. The example in FIG. 9 is in the context of cooking. Event hierarchy extraction can be performed by the video processing apparatus and its various components/networks as described in FIGS. 5-7. The example shown includes low-level events 900, high-level events 905, and video frames 910.

In some cases, the network abstracts several human interpretable events without supervision. For example, in a pasta-making demonstration in YouCook2 dataset, a single event corresponding to the description (i.e., "heat a pan add 1 spoon oil and prosciutto to it"), is divided into low level events 900 corresponding to "heat pan", "add oil", and "prosciutto". Each low-level event 900 is associated with a corresponding low-level event representation (i.e., multi-dimensional vector representation). Each high-level event 905 is associated with a corresponding high-level event representation. Low-level event representations and high-level event representations are denoted by $z^L$ and $z^H$, respectively. A sequencing number is also added to the notation to show its index in a set of events.

Similarly, a single high-level event 905 corresponding to "editing image text" is divided into low level events 900 such as changing text color, text font, typekit font, etc. Explicit event time labels are not provided to the video processing network which indicates that the network model can abstract such coherent sub-sequences (for subsequent video understanding). The low-level events 900 aggregate into clusters corresponding to frying or pouring while heating and seasoning. Similarly, the events abstracted by the video processing network is visualized when trained on chess opening data. The events learnt by the network are coherent and human-interpretable.

Low-level events 900 is an example of, or includes aspects of, the corresponding element described with reference to FIGS. 3, 4, 10, and 15. High-level events 905 is an example of, or includes aspects of, the corresponding element described with reference to FIG. 15. Video frames 910 is an example of, or includes aspects of, the corresponding element described with reference to FIGS. 3, 7, 13, and 15.

Figure 10:
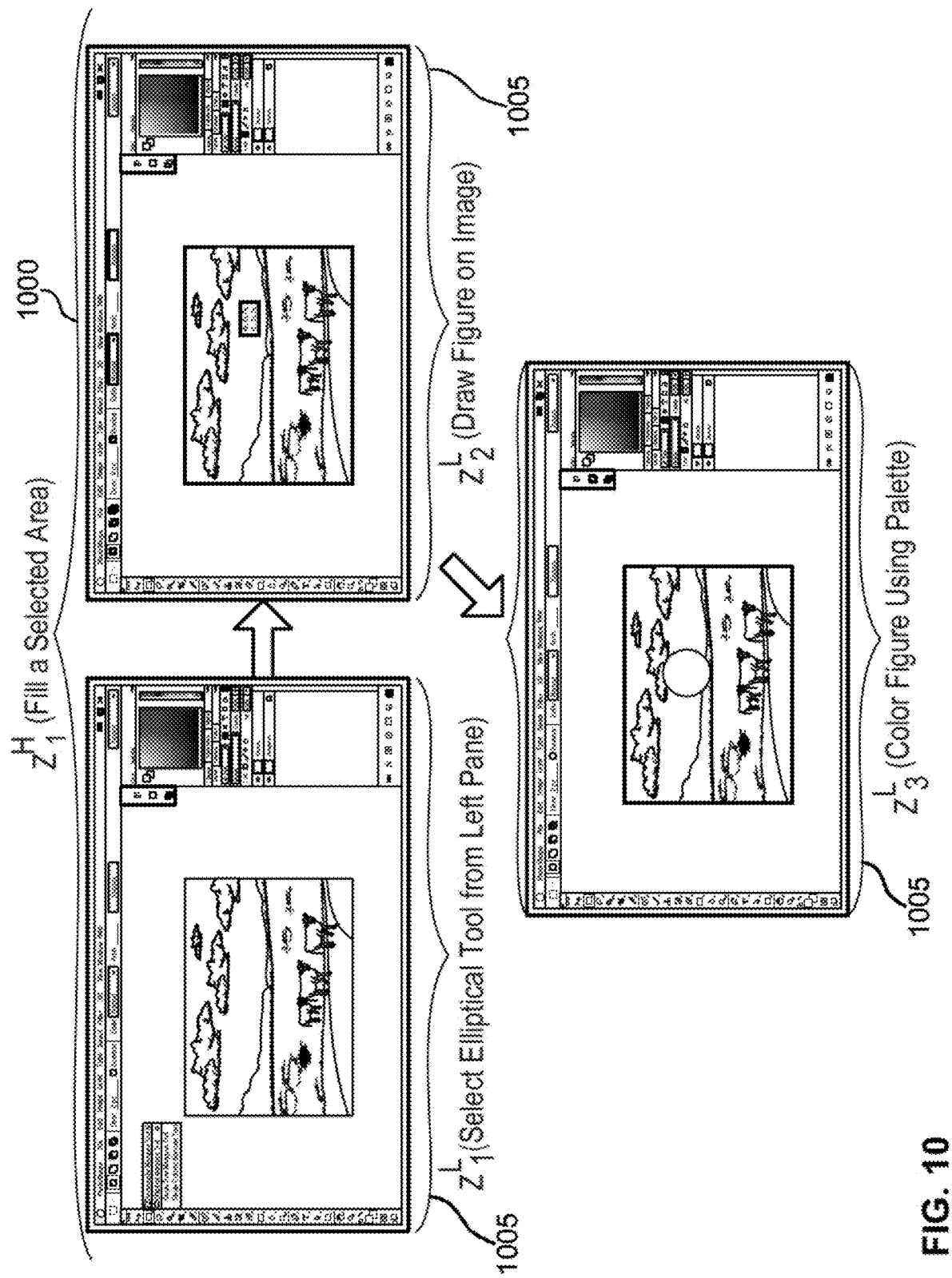
FIG. 10 shows an example of extracting a hierarchy of events according to aspects of the present disclosure.

FIG. 10 shows an example of extracting a hierarchy of events according to aspects of the present disclosure. The example in FIG. 10 is in the context of operating an image editing software. Event hierarchy extraction can be performed by the video processing apparatus and its various components/networks as described in FIGS. 5-7. The example shown includes high-level events 1000 and low-level events 1005. A high-level event 1000 (e.g., fill a selected area) is divided into low-level events 1005 (e.g., select elliptical tool from left pane, draw figure on image, and color figure using palette). High-level events 1000 is an example of, or includes aspects of, the corresponding element described with reference to FIGS. 3 and 4. Low-level events 1005 is an example of, or includes aspects of, the corresponding element described with reference to FIGS. 3, 4, 9, and 15.

Similarly, a high-level event (e.g., place layer behind another layer) is broken down into low-level events (e.g., select tiling option from header and drag right image to left using cursor). Another high-level event (e.g., Tilt-shift filter) is broken down into low-level events (e.g., select tilt-shift from header dropdown list and blur image using slider). Furthermore, a high-level event (e.g., remove unwanted content) is broken down into a set of low-level events (e.g., adjust brightness, saturation, and spot healing brush).

Figure 11:
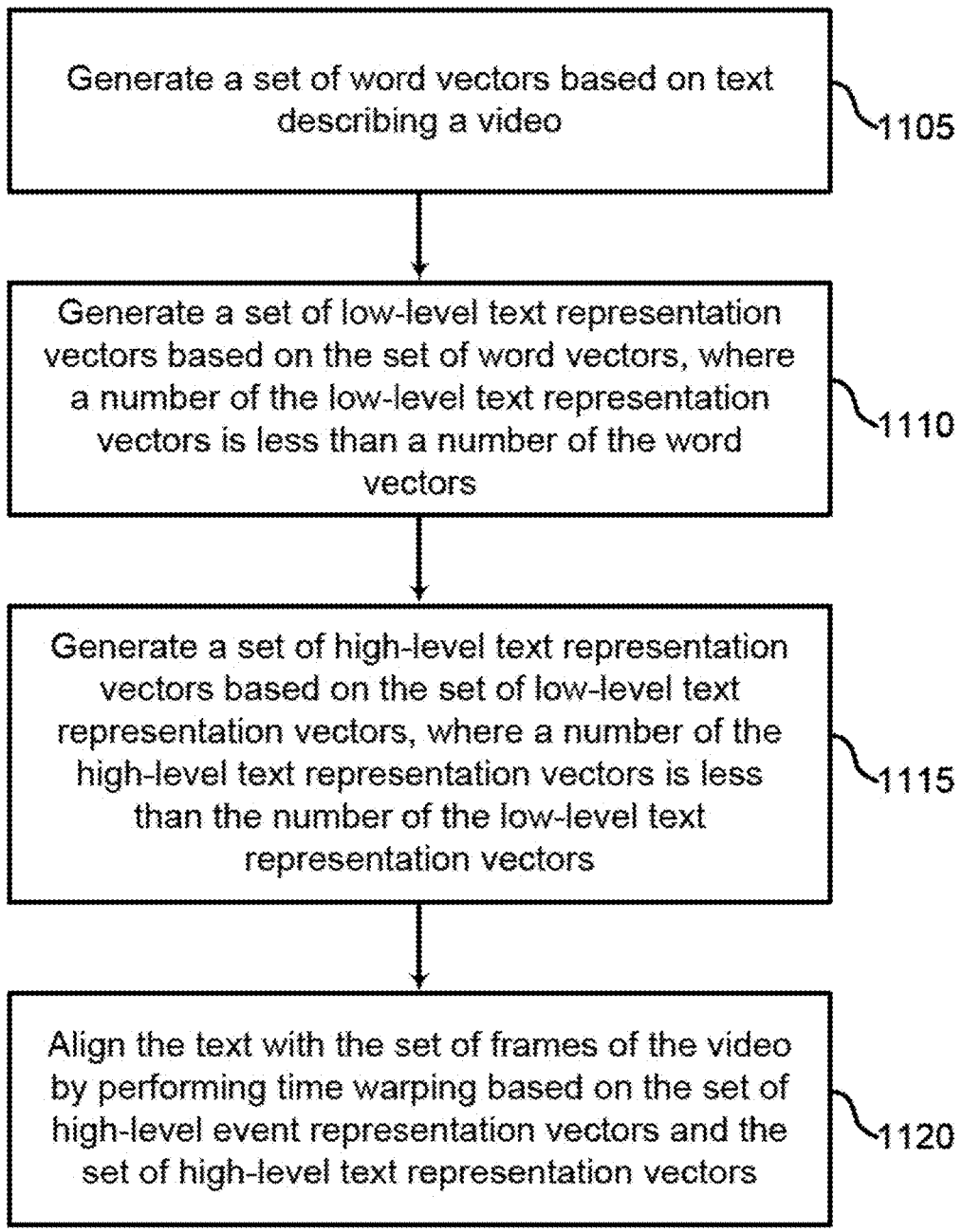
FIG. 11 shows an example of generating high-level text representation vectors according to aspects of the present disclosure.

FIG. 11 shows an example of generating high-level text representation vectors according to aspects of the present disclosure. An alignment component as shown in FIG. 5 can align the text with frames of a video by performing time warping. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a set of word vectors based on text describing a video. In some cases, the operations of this step refer to, or may be performed by, a text encoder as described with reference to FIGS. 5 and 13. According to an embodiment, a pre-trained transformer-based (e.g., BERT-base) generates word embeddings based on text input.

At operation 1110, the system generates a set of low-level text representation vectors based on the set of word vectors, where a number of the low-level text representation vectors is less than a number of the word vectors. In some cases, the operations of this step refer to, or may be performed by, a low-level image encoder as described with reference to FIGS. 5-7, and 13. According to an embodiment, low-level text representation vectors are $Z_W^L = z_{0:7}^L \sim q(z_w^L | W)$.

At operation 1115, the system generates a set of high-level text representation vectors based on the set of low-level text representation vectors, where a number of the high-level text representation vectors is less than the number of the low-level text representation vectors. In some cases, the operations of this step refer to, or may be performed by, a high-level image encoder as described with reference to FIGS. 5-7, and 13. According to an embodiment, high-level text representation vectors $Z_w^H = z_{0:3}^H \sim q(z_w^H | z_w^L)$ are generated using sequence to sequence (or seq2seq) transformer models.

At operation 1120, the system aligns the text with the set of frames of the video by performing time warping based on the set of high-level event representation vectors and the set of high-level text representation vectors. According to an embodiment, the video processing network decodes in a cross-modal manner, where the events abstracted from the visual domain are used to regenerate the textual description. In some examples, events abstracted from the text domain are used to regenerate the visual frames.

Figure 12:
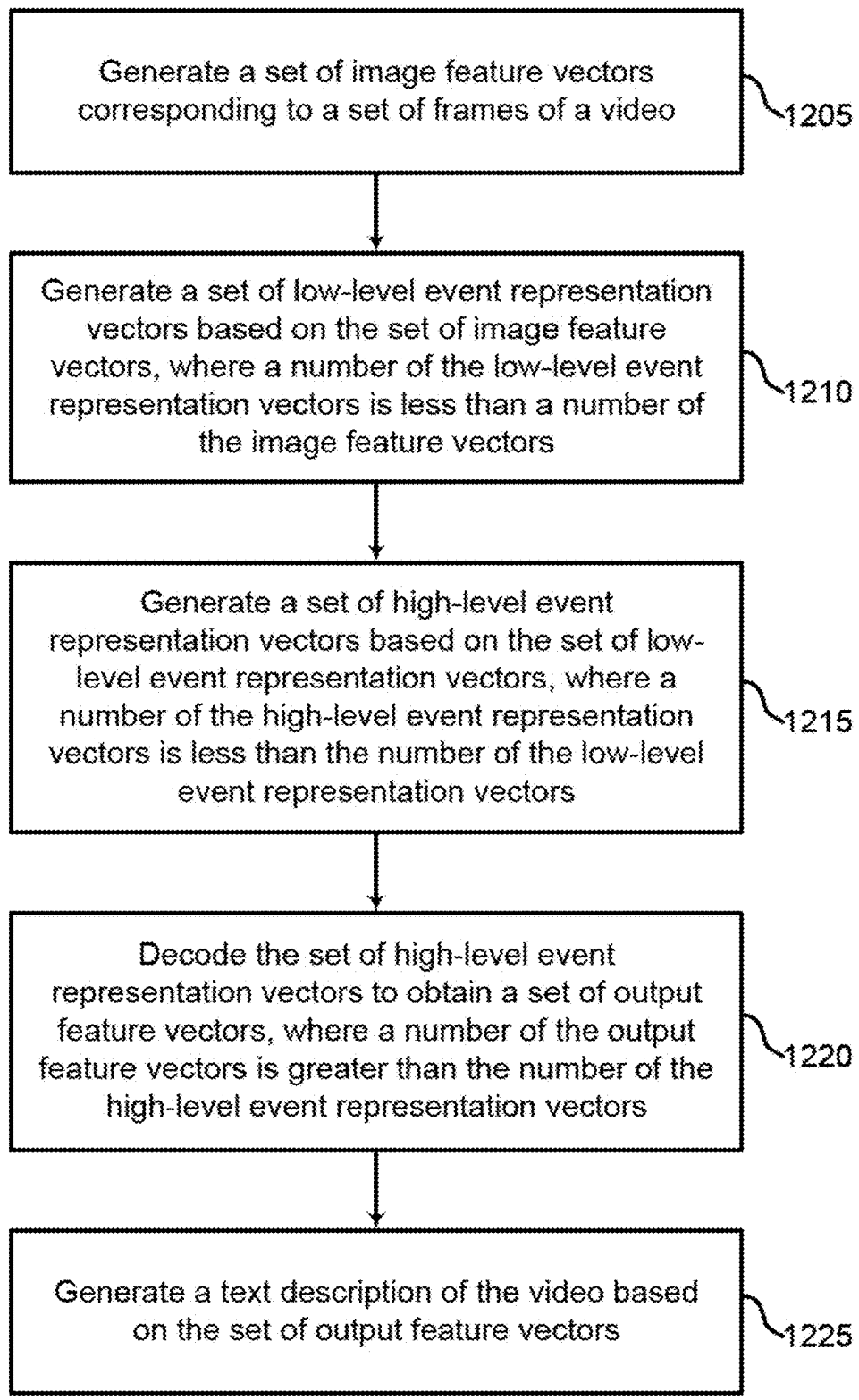
FIG. 12 shows an example of generating text description according to aspects of the present disclosure.

FIG. 12 shows an example of generating text description according to aspects of the present disclosure. Decoding high-level event representation vectors can be performed by an image output decoder as described with reference to FIGS. 5 and 7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system generates a set of image feature vectors corresponding to a set of frames of a video. In some cases, the operations of this step refer to, or may be performed by, an image encoder as described with reference to FIGS. 5-7, and 13.

At operation 1210, the system generates a set of low-level event representation vectors based on the set of image feature vectors, where a number of the low-level event representation vectors is less than a number of the image feature vectors. In some cases, the operations of this step refer to, or may be performed by, a low-level image encoder as described with reference to FIGS. 5-7, and 13.

At operation 1215, the system generates a set of high-level event representation vectors based on the set of low-level event representation vectors, where a number of the high-level event representation vectors is less than the number of the low-level event representation vectors. In some cases, the operations of this step refer to, or may be performed by, a high-level image encoder as described with reference to FIGS. 5-7, and 13.

At operation 1220, the system decodes the set of high-level event representation vectors to obtain a set of output feature vectors, where a number of the output feature vectors is greater than the number of the high-level event representation vectors. In some cases, the operations of this step refer to, or may be performed by, an image output decoder as described with reference to FIGS. 5, 7, and 13.

In some cases, the math notation prime refers to a re-generated value. According to an embodiment, high-level visual events are used to re-generate low-level textual events using $Z'^L_w = z'^L_{0:15} \sim p(z'^L_w | z^H_s)$ and subsequently re-generate words $W' = w_{0:n}' \sim p(w' | z'^L_w)$. Similarly, the high-level textual events are used to decode low-level visual events using $Z'^L_s = z'^L_{0:15} \sim p(z'^L_s | z^H_w)$ and subsequently re-generate demonstration frame embedding $S' = s'_{0:m} \sim p(s' | z'^L_s)$. Note that Z' and Z may differ in length to enable flexibility in the length of a high-level event in terms of constituent low-level events.

Given a low-level event representation, an associated sequence (of words or images) can be obtained using a decoder $\Phi^{x-dec}$:

$$x_t | z_t^L \sim \mathcal{N}(\mu_{x,t}, \sigma_{x,t}^2)$$

where $[\mu_{x,t}, \sigma_{x,t}^2] = \Phi^{x-dec}(z_t^L, x_{\leq t-1})$ (1)

where $X = x_{0:T}$ may correspond to a flattened embedding of words W or images S, and $\mathcal{N}(\cdot | \cdot)$ is a Gaussian distribution with parameters generated by the neural network $\Phi^{H-dec}$. Additionally, events exhibit a temporal hierarchy. High-level events are generated as:

$$z_t^H | z_{\leq t-1}^H \sim \mathcal{N}(\mu_{H,t}, \sigma_{H,t}^2)$$

where $[\mu_{H,t}, \sigma_{H,t}^2] = \Phi^{H-dec}(z_t^L, x_{\leq t-1}^H)$ (2)

Given a high-level event $z_t^H$, the associated sequence of low-level events can be approximated through a function $\Phi^{L-dec}$ as:

$$z_t^L | z_t^H, z_{\leq t-1}^L \sim \mathcal{N}(\mu_{L,t}, \sigma_{L,t}^2)$$

where $[\mu_{L,t}, \sigma_{L,t}^2] = \Phi^{L-dec}(z_t^H, x_{\leq t-1}^L)$ (3)

Thus, the resulting joint model mapped over trajectories of images $p(S, z^L, z^H)$ is factorized as:

$$p(s_0) \prod_{t=1}^{m} p(s_t | z_{\leq t}^L, s_{<t}) p(z_t^L | z_{<t}^L, z_{<t}^H) p(z_t^H, z_{<t}^H)$$ (4)

The resulting joint model mapped over trajectories of words $p(W, z^L, z^H)$ is factorized as:

$$p(w_0) \prod_{t=1}^{n} p(w_t | z_{\leq t}^L, w_{<t}) p(z_t^L | z_{<t}^L, z_{<t}^H) p(z_t^H, z_{<t}^H)$$ (5)

The functions $\Phi^{x-dec}$, $\Phi^{L-dec}$ and $\Phi^{H-dec}$ are approximated by sequence-to-sequence models (e.g., transformers). The transition functions $p(z_t^L | z_{<t}^L, z_{<t}^H)$ and $p(z_t^H, z_{<t}^H)$ are learned using fixed length transformer models.

In some examples, the head attention is passed through a Transformer decoder with 8 hidden layers to generate latent variables having dimension eventlength×768. A one-layer gated recurrent unit (GRU) is used for each of p(z|z) modules to generate low-level events from high-level events.

At operation 1225, the system generates a text description of the video based on the set of output feature vectors. In some cases, the operations of this step refer to, or may be performed by, a machine learning model as described with reference to FIG. 5.

Training and Evaluation

In FIGS. 13-17, a method, apparatus, and non-transitory computer readable medium for training a neural network are described. One or more embodiments of the method, apparatus, and non-transitory computer readable medium include generating a plurality of image feature vectors corresponding to a plurality of frames of a video; generating a plurality of low-level event representation vectors based on the plurality of image feature vectors, wherein a number of the low-level event representation vectors is less than a number of the image feature vectors; generating a plurality of high-level event representation vectors based on the plurality of low-level event representation vectors, wherein a number of the high-level event representation vectors is less than the number of the low-level event representation vectors; decoding the plurality of high-level event representation vectors to obtain a plurality of output feature vectors, wherein a number of the output feature vectors is greater than the number of the high-level event representation vectors; computing an unsupervised learning loss based on the plurality of image feature vectors and the output feature vectors; and updating parameters of a neural network based on the unsupervised learning loss.

Some examples of the method, apparatus, and non-transitory computer readable medium further include comparing each of the plurality of output feature vectors to a corresponding feature vector of the plurality of image feature vectors to obtain the unsupervised learning loss.

Some examples of the method, apparatus, and non-transitory computer readable medium further include decoding the plurality of high-level event representation vectors to obtain a plurality of output low-level event representation vectors, wherein a number of the output low-level event representation vectors is greater than the number of the high-level event representation vectors, and wherein the plurality of output feature vectors are generated based on the plurality of output low-level event representation vectors.

Some examples of the method, apparatus, and non-transitory computer readable medium further include comparing each of the output low-level event representation vectors to a corresponding low-level event representation vector of the plurality of low-level event representation vectors to obtain the unsupervised learning loss.

Some examples of the method, apparatus, and non-transitory computer readable medium further include generating a plurality of word vectors based on text describing the video. Some examples further include generating a plurality of low-level text representation vectors based on the plurality of word vectors, wherein a number of the low-level text representation vectors is less than a number of the word vectors. Some examples further include generating a plurality of high-level text representation vectors based on the plurality of low-level text representation vectors, wherein a number of the high-level text representation vectors is less than a number of the low-level text representation vectors. Some examples further include decoding the plurality of high-level text representation vectors to obtain a plurality of text output feature vectors, wherein a number of the text output feature vectors is greater than the number of the high-level text representation vectors.

Some examples of the method, apparatus, and non-transitory computer readable medium further include comparing the plurality of text output feature vectors to the plurality of image feature vectors to obtain the unsupervised learning loss.

Some examples of the method, apparatus, and non-transitory computer readable medium further include comparing the plurality of output feature vectors to the plurality of word vectors to obtain the unsupervised learning loss.

Some examples of the method, apparatus, and non-transitory computer readable medium further include aligning the text with the plurality of frames of the video by performing dynamic time warping based on the plurality of high-level event representation vectors and the plurality of high-level text representation vectors. Some examples further include computing a dynamic time warping loss based on the alignment, wherein the parameters of the neural network are updated based on the dynamic time warping loss.

Figure 13:
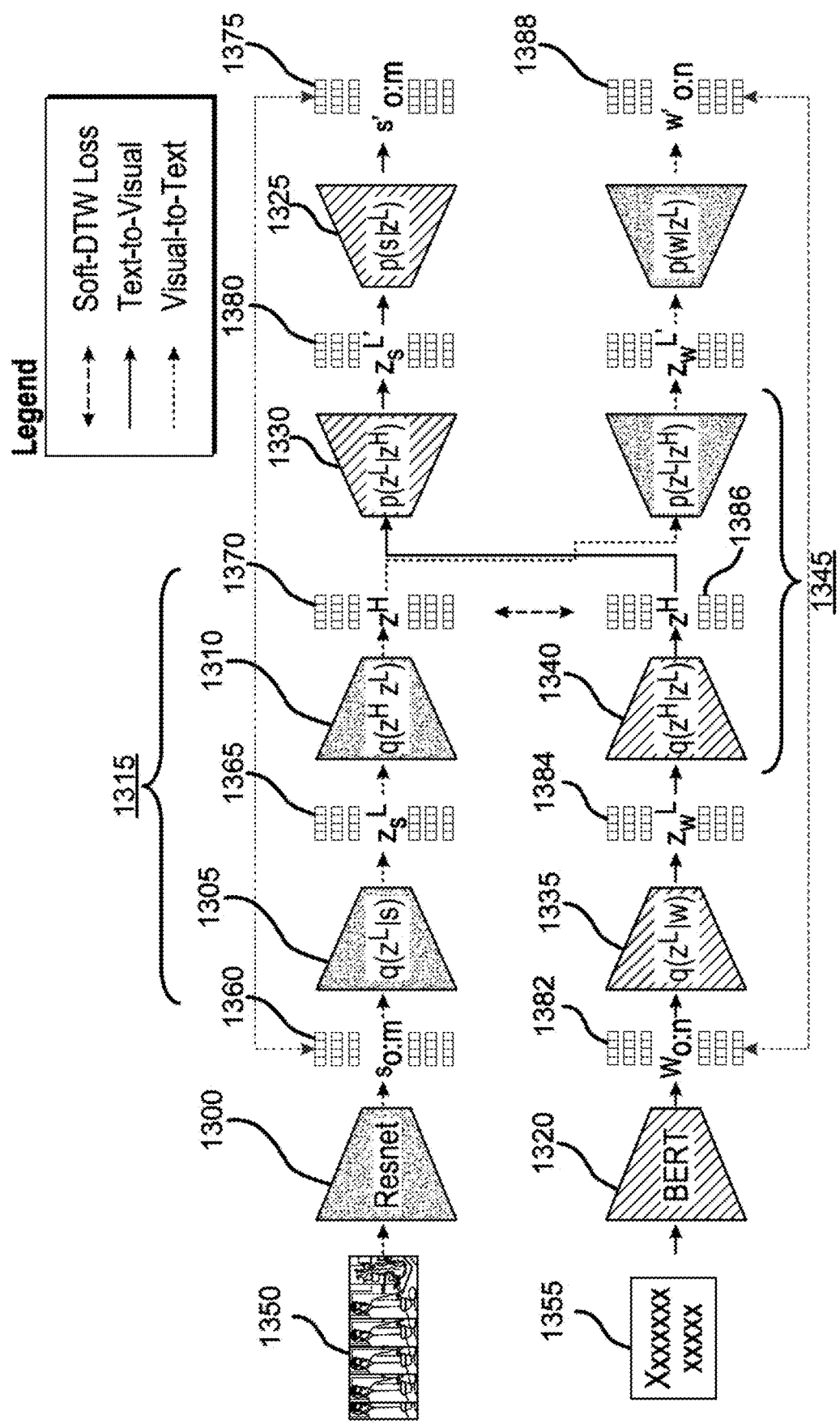
FIG. 13 shows an example of a video processing system trained using representation learning according to aspects of the present disclosure.

FIG. 13 shows an example of a video processing system trained using representation learning according to aspects of the present disclosure. Training component in FIG. 5 is used to train the neural network. The example shown includes image encoder 1300, low-level image encoder 1305, high-level image encoder 1310, event identification component 1315, text encoder 1320, image output decoder 1325, event representation decoder 1330, low-level text encoder 1335, high-level text encoder 1340, alignment component 1345, video frames 1350, text 1355, image feature vectors 1360, low-level event representation vectors 1365, high-level event representation vectors 1370, output feature vectors 1375, output low-level event representation vectors 1380, word vectors 1382, low-level text representation vectors 1384, high-level text representation vectors 1386, and text output feature vectors 1388.

According to some embodiments of the present disclosure, the video processing network is trained using unsupervised learning. Unsupervised learning is one of three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

According to an embodiment, the video processing network decodes high-level event representation vectors 1370 and high-level text representation vectors 1386 in a cross-modal manner, where the events abstracted from the visual domain are used to re-generate the textual description and vice-versa (i.e., events abstracted from the text domain are used to regenerate the visual frames or demonstration). Further, the prime notation refers to a re-generated value. Thus, the high-level visual events are used to re-generate low-level textual events using $Z'^{L}_{w} = z'^{L}_{0:15} \sim p(z'^{L}_{w}|z^{H}_{s})$ and subsequently re-generate words $W' = w'_{0:n} \sim p(w'|z'^{L}_{w})$. Similarly, the high-level textual events are used to decode low-level visual events using $Z'^{L}_{w} = z'^{L}_{0:15} \sim p(z'^{L}_{w}|z^{H}_{s})$ and subsequently re-generate demonstration frame embedding $S' = s'_{0:m} \sim p(s'|z'^{L}_{s})$. Note that Z' and Z may differ in length to enable flexibility in the length of a high-level event in terms of constituent low-level events.

In some cases, a three-level event hierarchy is achieved through adding additional transformers during encoding and decoding phases (i.e., adding a third level). For example, a video processing network generates 16 low-level, 8 mid-level, and 4 high level events (i.e., three-level event hierarchy). The third level of event provides a marginal increase in performance over TW-IoU scores. Embodiments of the present disclosure are not limited to two or three levels in the event hierarchy. The increase in performance results in increase in GPU memory usage during training. For example, GPU memory is increased due to number of model parameters in memory and additional losses.

According to an embodiment, the video processing network uses the Transformer architecture for modeling Φ and p( ) which results in a large model that may be difficult to train. Therefore, transformer modules can be replaced with GRU modules while maintaining the same number of layers. The GRU module-based model outperforms other unsupervised baseline methods and has competitive performance. The attention mechanism in Transformers and its model architecture enable learning of superior representations.

In some cases, given two trajectories $x = (x_1, x_2, \ldots x_n)$ and $y = (y_1, y_2, \ldots Y_m)$, the soft-DTW (x, y) computes the discrepancy between x and y as, $$\text{soft-}DTW(x,y) = \min^{\gamma}\{\langle A, \Delta(x,y) \rangle, A \in A_{n,m}\} \quad (6)$$

where $A \in A_{n,m}$ is the alignment matrix, $\Delta(x, y) = [\delta(x_i, y_i)]_{ij} \in \mathcal{R}^{n \times m}$ and $\delta$ is the cost function. $\min^{\gamma}$ operator is then computed as the following, $$\min^{\gamma}\{a_1, \cdots, a_n\} = \begin{cases} \min_{i \leq n} a_i, & \gamma = 0, \\ -\gamma \log \sum_{i=1}^{n} e^{-a_i/\gamma}, & \gamma > 0 \end{cases} \quad (7)$$

In some cases, $L_2$ distance is used as δ and γ=1. Hierarchical temporal segmentation (via the video processing network) does not depend on supervision, i.e., not dependent on annotations that demarcate the beginning and ending of an event, in language and in the space of frame's timestamps. The network uses multiple loss terms between network outputs for training. The soft-DTW is calculated between several sequences to generate the dynamic loss term, $\mathcal{L}_{dyn}$. Detail regarding training the network based on an unsupervised learning loss will be described in FIGS. 14 and 16. Detail regarding training the network based on a dynamic time warping loss will be described in FIG. 17.

Image encoder 1300 is an example of, or includes aspects of, the corresponding element described with reference to FIGS. 5-7. Low-level image encoder 1305 is an example of, or includes aspects of, the corresponding element described with reference to FIGS. 5-7. High-level image encoder 1310 is an example of, or includes aspects of, the corresponding element described with reference to FIGS. 5-7. Event identification component 1315 is an example of, or includes aspects of, the corresponding element described with reference to FIGS. 5-7. Text encoder 1320 is an example of, or includes aspects of, the corresponding element described with reference to FIG. 5.

Image output decoder 1325 is an example of, or includes aspects of, the corresponding element described with reference to FIGS. 5 and 7. Event representation decoder 1330 is an example of, or includes aspects of, the corresponding element described with reference to FIG. 5. Low-level text encoder 1335 is an example of, or includes aspects of, the corresponding element described with reference to FIG. 5. High-level text encoder 1340 is an example of, or includes aspects of, the corresponding element described with reference to FIG. 5. Alignment component 1345 is an example of, or includes aspects of, the corresponding element described with reference to FIG. 5.

Video frames 1350 is an example of, or includes aspects of, the corresponding element described with reference to FIGS. 3, 7, 9, and 15. Image feature vectors 1360 is an example of, or includes aspects of, the corresponding element described with reference to FIG. 7. Low-level event representation vectors 1365 is an example of, or includes aspects of, the corresponding element described with reference to FIG. 7. High-level event representation vectors 1370 is an example of, or includes aspects of, the corresponding element described with reference to FIG. 7. Output feature vectors 1375 is an example of, or includes aspects of, the corresponding element described with reference to FIG. 7. Output low-level event representation vectors 1380 is an example of, or includes aspects of, the corresponding element described with reference to FIG. 7.

Figure 14:
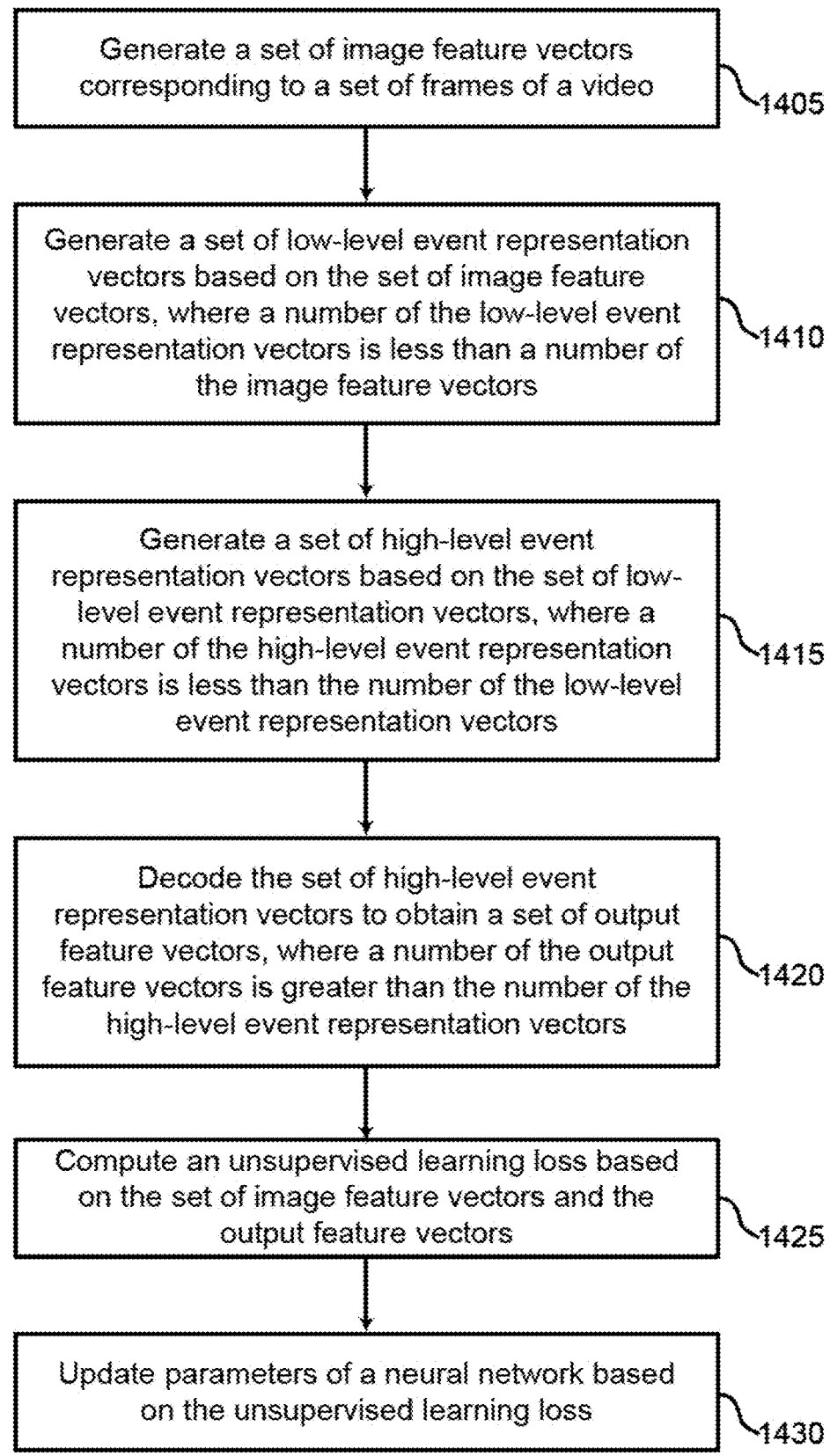
FIG. 14 shows an example of training a neural network for video processing according to aspects of the present disclosure.

FIG. 14 shows an example of training a neural network for video processing according to aspects of the present disclosure. Training component in FIG. 5 trains the neural network based on an unsupervised learning loss. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system generates a set of image feature vectors corresponding to a set of frames of a video. In some cases, the operations of this step refer to, or may be performed by, an image encoder as described with reference to FIGS. 5-7, and 13.

In some examples, the ground-truth events in the dataset and the events generated by the network may differ in number, duration, and start-time. The efficacy of the network in generating events that align with human-annotated events in a dataset is evaluated using metric described below. In some cases, the metric measures the overlap between generated events and ground truths, and accounts for possible temporal mismatch.

In some examples, the length of a frame sequence for a large-scale video dataset is capped. For example, the length of a frame sequence may be capped to 200 frames for YouCook2 dataset which is down-sampled from the original frames provided in the dataset due to memory. Subsequently, the trade-off between sequence length and performance is evaluated to show the effect of granularity of information used to discover naturalistic hierarchies.

YouCook2 dataset includes instructional videos for 89 unique recipes (i.e., approximately 22 videos per recipe). In some cases, an instructional video may contain labels that separate long horizon trajectories of demonstrations into events with explicit time stamps for the beginning and end of each event along with the associated commentary. For example, the YouCook2 dataset contains 1,333 videos for training and 457 videos for testing. The average number of segments per video is 7.7 and the average duration of the video is 5.27 minutes.

Similarly, a recommending chess openings dataset includes opening moves in a game of chess. An opening in chess is a fixed sequence of moves which when performed leads to a final board state putting the player in a strategic position in the game. Commonly used chess openings are each labeled with a name. In some examples, the dataset includes 20,058 openings that contain a sequence of chess moves and the corresponding opening and variation labels. The train-test split ratio used for experiments is 80-20.

For example, the TutorialVQA dataset includes 76 tutorial videos related to an image editing software. The videos include spoken instructions which are transcribed and manually segmented. For example, the videos may be segmented into 408 segments with an average transcript length of 48.

At operation 1410, the system generates a set of low-level event representation vectors based on the set of image feature vectors, where a number of the low-level event representation vectors is less than a number of the image feature vectors. In some cases, the operations of this step refer to, or may be performed by, a low-level image encoder as described with reference to FIGS. 5-7, and 13.

At operation 1415, the system generates a set of high-level event representation vectors based on the set of low-level event representation vectors, where a number of the high-level event representation vectors is less than the number of the low-level event representation vectors. In some cases, the operations of this step refer to, or may be performed by, a high-level image encoder as described with reference to FIGS. 5-7, and 13.

At operation 1420, the system decodes the set of high-level event representation vectors to obtain a set of output feature vectors, where a number of the output feature vectors is greater than the number of the high-level event representation vectors. In some cases, the operations of this step refer to, or may be performed by, an image output decoder as described with reference to FIGS. 5, 7, and 13.

At operation 1425, the system computes an unsupervised learning loss based on the set of image feature vectors and the output feature vectors. In some cases, the operations of this step refer to, or may be performed by, a training component as described with reference to FIG. 5.

At operation 1430, the system updates parameters of a neural network based on the unsupervised learning loss. In some cases, the operations of this step refer to, or may be performed by, a training component as described with reference to FIG. 5.

The video processing network performs a visual ordering task and is trained via unsupervised learning. In some cases, the representations discovered can be used for visual ordering task. The task involves taking a given sequence of video frames as input and using a trained model with frozen weights to discover the high-level events associated with the video frames. The task can be used to predict whether or not the given sequence of frames are in a correct or meaningful order, i.e., binary classification. In some cases, a one-layer GRU network is used to perform classification.

In some examples, frames are extracted from the YouCook2 dataset to create training data. The frames are randomly shuffled to obtain a sequence of frames creating 10 negative examples for each positive sample in the dataset. In some examples, the video processing network outperforms a baseline method (e.g., FLAT) by a significant gain of 12% in the F1 score and 2% in accuracy.

In some examples, the maximum number of events discovered at low-level and high-level may be 16 and 4, respectively. The assumptions are based on the YouCook2 dataset statistics where the minimum number of segments is 5 and the maximum number of segments is 16. The video processing network is trained using a gradient descent method (e.g., along with Adam optimizer). For example, the network is trained for 100 epochs with lr=1e−5, $\alpha$=1 and $\beta$=1 for the experiments with a batch-size of 128. A computer processor (e.g., 16× Nvidia A100 GPUs) may be used to train the network which takes approximately 48 hours to reproduce the results.

FIG. 15 shows an example of representation learning guided by commentary according to aspects of the present disclosure. The example shown includes low-level events 1500, high-level events 1505, and video frames 1510. A video may include a set of video frames 1510, where a subset of the video frames 1510 describes or corresponds to an event in a domain of interest (e.g., cooking).

The effect of language on event discovery is evaluated. In some cases, the network with and without commentary are compared which discover event hierarchy using frames. Additionally, the network uses word embeddings from certain text as guide. In some examples, language increases the TW-IoU by approximately 10% which suggests that use of commentary with the network increases the precision of boundary detection of segments corresponding to events in a trajectory. Furthermore, implicit hierarchical nature of the language provides inductive bias to the model to learn a natural hierarchy of events.

Additionally, a video processing network without commentary (also referred to as a direct hierarchy baseline) is evaluated. In some cases, the $Z^L = z'_{0:T}{}^L \sim p(z'^L | z^H)$ modules are removed, and the word and visual sequence embeddings are re-generated from high-level events such as $X' = x'_{0:T}{}^H \sim p(x' | z^H)$. The simplified network results in decrease of TW-IoU which confirms the significance of stepwise encoding-and-decoding scheme as example network models described in FIGS. 7 and 13.

The effect of adding commentary as guide during training is evaluated. In some cases, through using commentary as guide during training, the network learns to combine low-level events to form high-level events which are better aligned towards the ground-truth annotations. For example, three model variants, i.e., a network without comment, a direct hierarchy variant model, and FLAT baseline with comment are compared (see FIG. 7). The direct hierarchy variant can directly predict the sequence of frames from a high-level event.

Low-level events 1500 is an example of, or includes aspects of, the corresponding element described with reference to FIGS. 3, 4, 9, and 10. High-level events 1505 is an example of, or includes aspects of, the corresponding element described with reference to FIG. 9. Video frames 1510 is an example of, or includes aspects of, the corresponding element described with reference to FIGS. 3, 7, 9, and 13.

Figure 16:
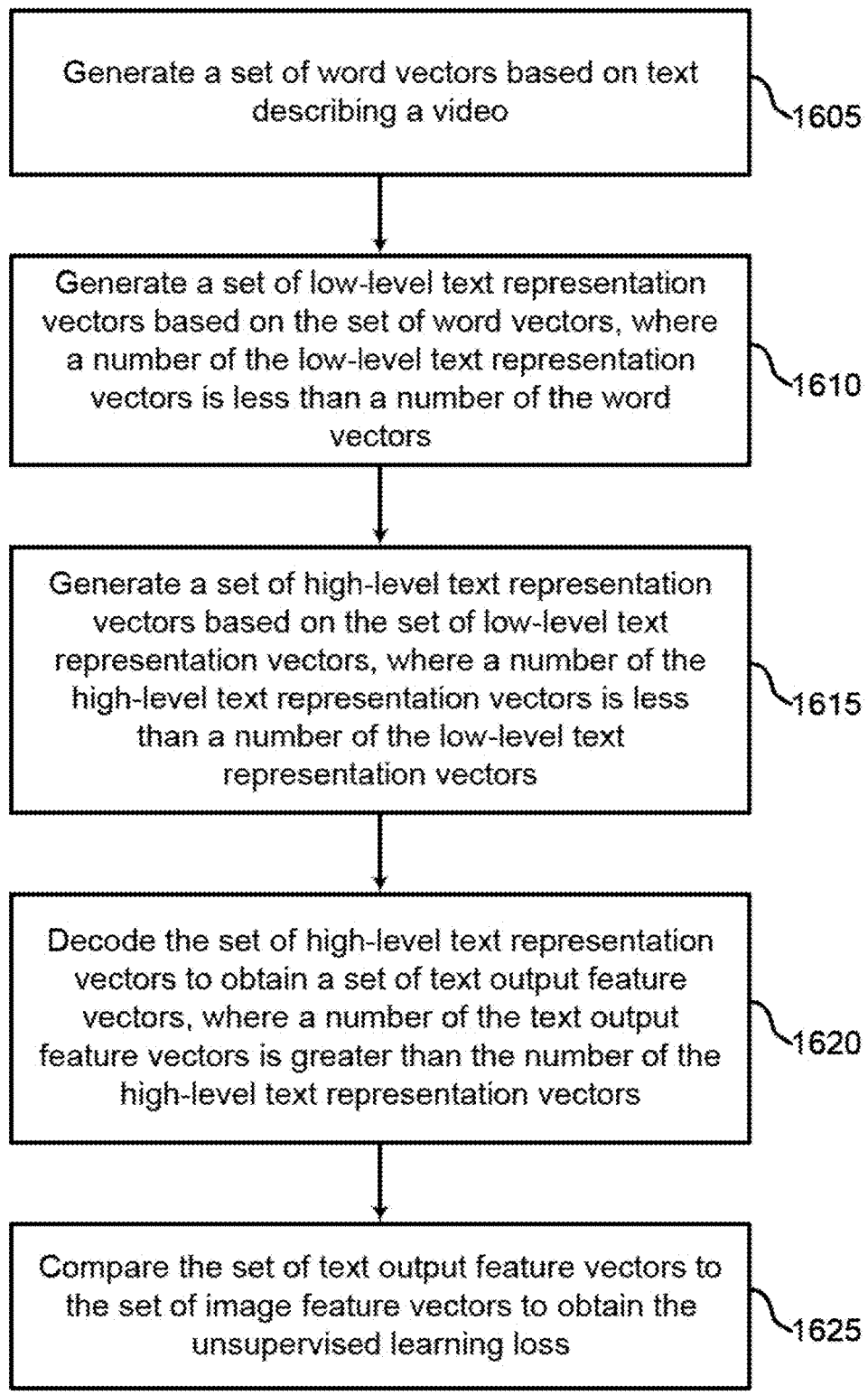
FIG. 16 shows an example of training a neural network based on an unsupervised learning loss according to aspects of the present disclosure.

FIG. 16 shows an example of training a neural network based on an unsupervised learning loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system generates a set of word vectors based on text describing a video. In some cases, the operations of this step refer to, or may be performed by, a text encoder as described with reference to FIGS. 5 and 13.

At operation 1610, the system generates a set of low-level text representation vectors based on the set of word vectors, where a number of the low-level text representation vectors is less than a number of the word vectors. In some cases, the operations of this step refer to, or may be performed by, a low-level text encoder as described with reference to FIGS. 5 and 13.

At operation 1615, the system generates a set of high-level text representation vectors based on the set of low-level text representation vectors, where a number of the high-level text representation vectors is less than a number of the low-level text representation vectors. In some cases, the operations of this step refer to, or may be performed by, a high-level text encoder as described with reference to FIGS. 5 and 13.

At operation 1620, the system decodes the set of high-level text representation vectors to obtain a set of text output feature vectors, where a number of the text output feature vectors is greater than the number of the high-level text representation vectors. In some cases, the operations of this step refer to, or may be performed by, a machine learning model as described with reference to FIG. 5.

At operation 1625, the system compares the set of text output feature vectors to the set of image feature vectors to obtain the unsupervised learning loss. In some cases, the operations of this step refer to, or may be performed by, a training component as described with reference to FIG. 5.

According to an embodiment, a negative log-likelihood loss ($\mathcal{L}_{nll}$) between the re-generated comment vectors W' and the BERT vectors W is formulated as follows, $$\mathcal{L}_{static} = \mathcal{L}_{nll}(W, W') + L_2(Z_s^H, Z_w^H) + L_2(Z'_s{}^L, Z'_w{}^L) \tag{8}$$

The total loss is defined as $\mathcal{L}_{total} = \mathcal{L}_{dyn} + \beta * \mathcal{L}_{static}$. The loss function incorporates the inductive bias used for learning the event latent space.

Figure 17:
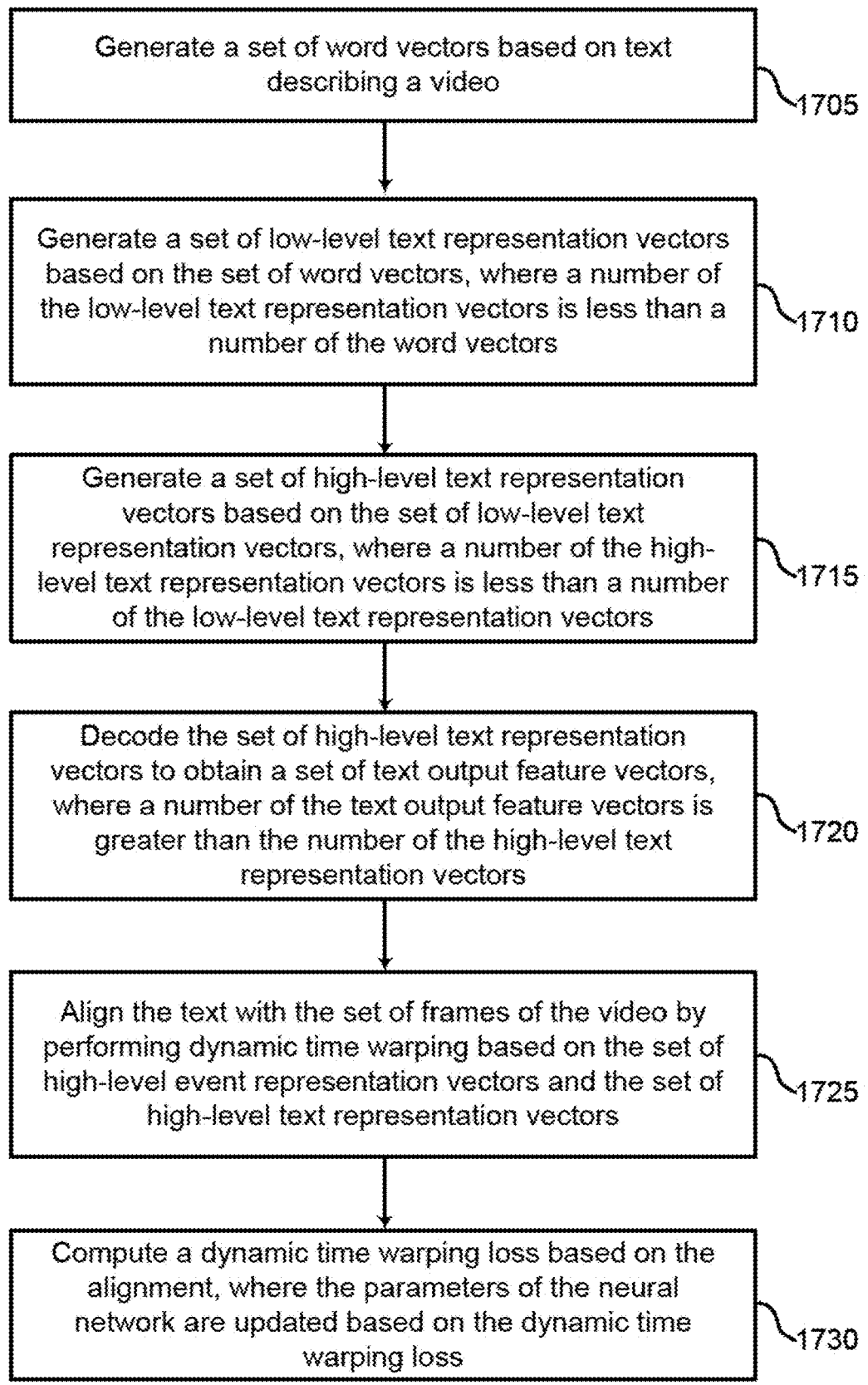
FIG. 17 shows an example of training a neural network based on a dynamic time warping loss according to aspects of the present disclosure.

FIG. 17 shows an example of training a neural network based on a dynamic time warping loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system generates a set of word vectors based on text describing the video. In some cases, the operations of this step refer to, or may be performed by, a text encoder as described with reference to FIGS. 5 and 13.

Consider the search series $X = (x_1, x_2, x_3 \ldots x_M)$ and target series $T = (t_1, t_2, t_3 \ldots t_N)$ where X corresponds to the end-of-event time stamp for each event as generated by the network for a single long-horizon demonstration trajectory. Thus, the $i^{th}$ event abstracted from the network starts at time $x_{i-1}$ and ends at time $x_i$. Similarly, T corresponds to the end-of-event time stamp for each ground-truth event in the demonstration trajectory, where the $j^{th}$ ground truth event starts at time $t_{j-1}$ and ends at time $t_j$. Note that both $x_0$ and $t_0$ are equal to zero, i.e., time is measured starting at zero for demonstration trajectories.

At operation 1710, the system generates a set of low-level text representation vectors based on the set of word vectors, where a number of the low-level text representation vectors is less than a number of the word vectors. In some cases, the operations of this step refer to, or may be performed by, a low-level text encoder as described with reference to FIGS. 5 and 13.

At operation 1715, the system generates a set of high-level text representation vectors based on the set of low-level text representation vectors, where a number of the high-level text representation vectors is less than a number of the low-level text representation vectors. In some cases, the operations of this step refer to, or may be performed by, a high-level text encoder as described with reference to FIGS. 5 and 13.

At operation 1720, the system decodes the set of high-level text representation vectors to obtain a set of text output feature vectors, where a number of the text output feature vectors is greater than the number of the high-level text representation vectors. In some cases, the operations of this step refer to, or may be performed by, a machine learning model as described with reference to FIG. 5.

At operation 1725, the system aligns the text with the set of frames of the video by performing dynamic time warping based on the set of high-level event representation vectors and the set of high-level text representation vectors. In some cases, the operations of this step refer to, or may be performed by, an alignment component as described with reference to FIG. 5.

The two representations are aligned using dynamic time warping (DTW) to compute the intersection over union (IoU) between ground truth and outputs from the video processing network. Accordingly, $\Delta(X, T)$ is calculated by solving the following DTW optimization problem, $\Delta(X, T) = min_{P \in \mathcal{P}} \Sigma_{m,n \in P} \delta(x_m, t_n)$, where the X and T correspond to the search and target series respectively and $\delta$ corresponds to a distance metric (e.g., the $L_2$ norm), measuring time mismatch.

$\Delta(X, T)$ corresponds to the trajectory discrepancy measure defined as the matching cost for the optimal matching path P among possible valid matching paths $\mathcal{P}$ (i.e., paths satisfying monotonicity, continuity, and boundary conditions). The warping function W can be obtained from the optimal trajectory such that $W(x_i) = t_j$, i.e., the optimal mapping between the $i^{th}$ event ending at time $x_i$ and the $j^{th}$ event ending at time $t_j$. The resulting intersection over union for a single long-horizon trajectory, TW-IoU:

$$TW-IoU = \sum_{t_i} \frac{\sum_{x_j: W(x_j) = t_i} \min(t_i, x_j) - \max(t_{i-1}, x_{j-1})}{\max_{x_j: W(x_j) = t_i} \{\max(t_i, x_j) - \min_{x_j: W(x_j) = t_i} \min(t_{i-1}, x_{j-1})\}} \quad (9)$$

According to an embodiment, the video processing network is trained using multiple loss terms between network outputs. The soft-DTW is calculated between several sequences to generate the dynamic loss term, $\mathcal{L}_{dyn}$.

$$\mathcal{L}_{dyn} = \text{soft-}DTW(Z_w^L, Z'_w^L) + \text{soft-}DTW(Z_s^L, Z'_s^L) + \text{soft-}DTW(S, S') \quad (10)$$

At operation 1730, the system computes a dynamic time warping loss based on the alignment, where the parameters of the neural network are updated based on the dynamic time warping loss. In some cases, the operations of this step refer to, or may be performed by, a training component as described with reference to FIG. 5. As illustrated in the above equation, the term soft-DTW (S, S') ensures reconstruction of demonstration frames from the textual events, while $\mathcal{L}_{nll}(W, W')$ ensures the generation of textual description from visual events. soft-DTW ($Z_s^H$, $Z_W^H$) aligns the textual event space and visual event space.

The encoding and decoding modules and losses are evaluated. In some cases, the soft-DTW ($Z_s^L$, $Z'_s^L$) loss may be removed from the network. The loss guides the alignment between the encoded low-level events ($Z_s^L$) and the reconstructed low-level events ($Z'_s^L$) Math notation prime is used to show it is a reconstructed event. Removal of the loss reduces the TW-IoU scores significantly.

TW-IoU considers original temporal boundaries. A time-warped alignment function finds the optimal mapping for an interval (i.e., for each interval in the generated event segments) to one of ground-truth intervals in the dataset. For example, a ground-truth segment may include 2 events, [0, a] and [a, a+b], i.e., a first event starts at time 0 ends at time a, and a second event starts at time a and ends at time (a+b).

Consider two different sets of aligned predictions, i.e., one predicted event [0, c+d] and two predicted events [c, c+d] and [c, c+d]. In some cases, c>a, d>b and a, b, c, d are assumed as positive real numbers without loss of generality. Therefore, $$TW-IoU = \frac{(a+b)}{(c+d)} \text{ and } TW-IoU = \frac{(a)}{(c)} + \frac{(b)}{(d)}.$$

TW-IoU is greater for $$\frac{(a)}{(c)} + \frac{(b)}{(d)} \text{ than } \frac{(a+b)}{(c+d)}$$

and is preferred due to presence of 2 ground-truth events in the search series. The performance of TW-IoU is influenced by $$\frac{(a)}{(c)} + \frac{(b)}{(d)}$$

which is a better prediction due to hierarchical breakdown of original high-level input to find two low-level events. Additionally, the alignment function in TW-IoU works sequentially, i.e., the network is prevented from aligning any interval with current ground-truth being processed until previous intervals have been aligned.

Performance of apparatus, systems and methods of the present disclosure have been evaluated, and results indicate embodiments of the present disclosure have obtained increased performance over existing technology. Example experiments demonstrate that the video processing network outperforms conventional systems.

The performance of the network is evaluated on You-Cook2 and TutorialVQA. In some cases, the performance of the network to generate coherent events that align with human annotated ground truths is quantified using the TW-IoU metric. In some examples, the network is compared with six baseline methods.

GRU time stamp prediction: a supervised baseline including a GRU-based encoder that sequentially processes ResNet features corresponding to frames in a video followed by a decoder GRU. In some cases, the decoder GRU attends to encoder outputs and is trained to sequentially predict end-of-event timestamps of each meaningful segment (variable in number) in the video.

FLAT without comment: in some cases, an unsupervised skill learning is implemented without environment. For example, a model takes a sequence of video frames as input and the model discovers a single level of events without hierarchy.

FLAT with comment: a modified multi-modal skill learning is implemented where frames and words are utilized to form a single-level latent event representation. The baseline establishes the effect of hierarchical and multi-modal learning on the representations obtained.

Clustering—ResNet32 embeddings: given an input sequence of frames, the weight function based on the corresponding temporal position in the sequence is defined along with the $L_2$ distance between frame embeddings. A standard K-means algorithm (e.g., K=4) is used to cluster the frames based on the weighting function defined. In some cases, the clusters formed are used to predict the temporal boundaries.

Clustering—HowTo100M embeddings: the pre-trained embeddings from the supervised action recognition dataset and method are used and a K-means (e.g., K=4) clustering is applied on the embeddings.

GRU supervised segment prediction: in some cases, a decoder is trained to predict or assign identical ids to frames which are part of the same segment. Furthermore, the decoder of the model is trained to assign different ids to frames that are part of different segments, while frames that are not part of a meaningful segment in the ground truth are trained to have a default null id (i.e., 0).

Some experiments compare the TW-IoU computed between ground truth time stamp annotations and the predicted or discovered segments. The video processing network achieves the maximum value of TW-IoU when compared with other unsupervised baseline methods. Additionally, the network discovers events that align better with ground truth events. In some examples, the network outperforms unsupervised skill learning methods by approximately 23% and is competitive with regards to supervised baseline methods.

In some examples, the video processing network is evaluated on the label prediction task. In some examples, the name of opening and variation may be predicted using hierarchical event (i.e., strategy) representations discovered on the chess openings dataset. For example, the dataset includes a label for each sequence of moves in an opening with 300 distinct labels for each opening and variation. A linear classifier is trained which uses the embedding generated by the video processing network to predict the label. In some examples, the classifier achieves 78.2% accuracy of prediction. Thus, the representations abstracted by the network contain temporal information that aligns with human understanding of chess strategies. In some cases, the network represents openings and variations as hierarchical events. Additionally, the network can associate the openings and variations with the correct label.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for video processing, comprising:
generating a plurality of image feature vectors corresponding to a plurality of frames of a video;
generating a plurality of low-level event representation vectors based on the plurality of image feature vectors, wherein a number of the low-level event representation vectors is less than a number of the image feature vectors;
generating a plurality of high-level event representation vectors based on the plurality of low-level event representation vectors, wherein a number of the high-level event representation vectors is less than the number of the low-level event representation vectors; and
identifying a plurality of high-level events occurring in the video based on the plurality of high-level event representation vectors.

2. The method of claim 1, further comprising:
identifying a plurality of low-level events occurring in the video based on the plurality of low-level event representation vectors, wherein the plurality of low-level events are related to the plurality of high-level events according to an event hierarchy.

3. The method of claim 1, further comprising:
generating a plurality of word vectors based on text describing the video;
generating a plurality of low-level text representation vectors based on the plurality of word vectors, wherein a number of the low-level text representation vectors is less than a number of the word vectors; and
generating a plurality of high-level text representation vectors based on the plurality of low-level text representation vectors, wherein a number of the high-level text representation vectors is less than the number of the low-level text representation vectors.

4. The method of claim 3, further comprising:
aligning the text with the plurality of frames of the video by performing time warping based on the plurality of high-level event representation vectors and the plurality of high-level text representation vectors.

5. The method of claim 1, further comprising:
decoding the plurality of high-level event representation vectors to obtain a plurality of output feature vectors, wherein a number of the output feature vectors is greater than the number of the high-level event representation vectors; and
generating a text description of the video based on the plurality of output feature vectors.

6. The method of claim 1, further comprising:
generating a plurality of higher-level event representation vectors based on the plurality of high-level event representation vectors, wherein a number of the higher-level event representation vectors is less than the number of the high-level event representation vectors, wherein the plurality of high-level events are identified based on the plurality of higher-level event representation vectors.

7. The method of claim 1, further comprising:
down-sampling the video to obtain the plurality of frames.

8. A method for training a neural network, comprising:
generating a plurality of image feature vectors corresponding to a plurality of frames of a video;
generating a plurality of low-level event representation vectors based on the plurality of image feature vectors, wherein a number of the low-level event representation vectors is less than a number of the image feature vectors;
generating a plurality of high-level event representation vectors based on the plurality of low-level event representation vectors, wherein a number of the high-level event representation vectors is less than the number of the low-level event representation vectors;
decoding the plurality of high-level event representation vectors to obtain a plurality of output feature vectors, wherein a number of the output feature vectors is greater than the number of the high-level event representation vectors;
computing an unsupervised learning loss based on the plurality of image feature vectors and the output feature vectors; and
updating parameters of a neural network based on the unsupervised learning loss.

9. The method of claim 8, further comprising:
comparing each of the plurality of output feature vectors to a corresponding feature vector of the plurality of image feature vectors to obtain the unsupervised learning loss.

10. The method of claim 8, further comprising:
decoding the plurality of high-level event representation vectors to obtain a plurality of output low-level event representation vectors, wherein a number of the output low-level event representation vectors is greater than the number of the high-level event representation vectors, and wherein the plurality of output feature vectors are generated based on the plurality of output low-level event representation vectors.

11. The method of claim 10, further comprising:
comparing each of the output low-level event representation vectors to a corresponding low-level event representation vector of the plurality of low-level event representation vectors to obtain the unsupervised learning loss.

12. The method of claim 8, further comprising:
generating a plurality of word vectors based on text describing the video;
generating a plurality of low-level text representation vectors based on the plurality of word vectors, wherein a number of the low-level text representation vectors is less than a number of the word vectors;
generating a plurality of high-level text representation vectors based on the plurality of low-level text representation vectors, wherein a number of the high-level text representation vectors is less than a number of the low-level text representation vectors; and
decoding the plurality of high-level text representation vectors to obtain a plurality of text output feature vectors, wherein a number of the text output feature vectors is greater than the number of the high-level text representation vectors.

13. The method of claim 12, further comprising:
comparing the plurality of text output feature vectors to the plurality of image feature vectors to obtain the unsupervised learning loss.

14. The method of claim 12, further comprising:
comparing the plurality of output feature vectors to the plurality of word vectors to obtain the unsupervised learning loss.

15. The method of claim 12, further comprising:
aligning the text with the plurality of frames of the video by performing dynamic time warping based on the plurality of high-level event representation vectors and the plurality of high-level text representation vectors; and
computing a dynamic time warping loss based on the alignment, wherein the parameters of the neural network are updated based on the dynamic time warping loss.

16. An apparatus for video processing, comprising:
an image encoder configured to generate a plurality of image feature vectors corresponding to a plurality of frames of a video;
a low-level image encoder configured to generate a plurality of low-level event representation vectors based on the plurality of image feature vectors, wherein a number of the low-level event representation vectors is less than a number of the image feature vectors;
a high-level image encoder configured to generate a plurality of high-level event representation vectors based on the plurality of low-level event representation vectors, wherein a number of the high-level event representation vectors is less than the number of the low-level event representation vectors; and
an event identification component configured to identify a plurality of high-level events occurring in the video based on the plurality of high-level event representation vectors.

17. The apparatus of claim 16, further comprising:
an image output decoder configured to decode the plurality of high-level event representation vectors to obtain a plurality of output feature vectors, wherein a number of the output feature vectors is greater than the number of the high-level event representation vectors.

18. The apparatus of claim 17, further comprising:
an event representation decoder configured to decode the plurality of high-level event representation vectors to obtain a plurality of output low-level event representation vectors, wherein a number of the output low-level event representation vectors is greater than the number of the high-level event representation vectors, and wherein the plurality of output feature vectors are generated based on the plurality of output low-level event representation vectors.

19. The apparatus of claim 16, further comprising:
a text encoder configured to generate a plurality of word vectors based on text describing the video;
a low-level text encoder configured to generate a plurality of low-level text representation vectors based on the plurality of word vectors, wherein a number of the low-level text representation vectors is less than a number of the word vectors; and
a high-level text encoder configured to generate a plurality of high-level text representation vectors based on the plurality of low-level text representation vectors, wherein a number of the high-level text representation vectors is less than the number of the low-level text representation vectors.

20. The apparatus of claim 19, further comprising:
an alignment component configured to align the text with the plurality of frames of the video by performing time warping based on the plurality of high-level event representation vectors and the plurality of high-level text representation vectors.

\* \* \* \* \*